United States Patent
Yang et al.

(10) Patent No.: US 11,743,131 B2
(45) Date of Patent: Aug. 29, 2023

(54) CLOUDIFIED USER-LEVEL TRACING

(71) Applicant: VMware, Inc., Palo Alto, CA (US)

(72) Inventors: Yang Yang, Morris Plains, NJ (US); Rakesh Misra, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/384,475

(22) Filed: Jul. 23, 2021

(65) Prior Publication Data
US 2022/0286837 A1     Sep. 8, 2022

Related U.S. Application Data

(60) Provisional application No. 63/180,627, filed on Apr. 27, 2021, provisional application No. 63/176,859, (Continued)

(51) Int. Cl.
*H04L 43/10* (2022.01)
*H04W 8/18* (2009.01)
(Continued)

(52) U.S. Cl.
CPC ............ *G06F 9/45558* (2013.01); *G06F 8/60* (2013.01); *G06F 9/3877* (2013.01); *G06F 9/4411* (2013.01); *G06F 9/45533* (2013.01); *G06F 9/45545* (2013.01); *G06F 9/4881* (2013.01); *G06F 9/541* (2013.01); *G06F 9/544* (2013.01); *G06F 9/546* (2013.01); *G06F 11/3409* (2013.01); *G06F 30/331* (2020.01); *G06N 20/00* (2019.01); *H04B 7/0452* (2013.01);
(Continued)

(58) Field of Classification Search
None
See application file for complete search history.

(56) References Cited

U.S. PATENT DOCUMENTS 6,504,818 B1    1/2003  Levine
7,417,947 B1    8/2008  Marques et al.
(Continued)

FOREIGN PATENT DOCUMENTS

CN    114449459 A    5/2022
JP    2017516424 A    6/2017
(Continued)

OTHER PUBLICATIONS

Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.
(Continued)

*Primary Examiner* — John A Follansbee
*Assistant Examiner* — Kamal M Hossain
(74) *Attorney, Agent, or Firm* — Adeli LLP

(57) ABSTRACT

Some embodiments provide a method for performing radio access network (RAN) functions in a cloud at a user-level tracing application that executes on a machine deployed on a host computer in the cloud. The method receives data, via a RAN intelligent controller (RIC), from a RAN component. The method uses the received data to generate information related to traffic performance for at least one user. The method provides the generated information to the RIC.

21 Claims, 17 Drawing Sheets

Related U.S. Application Data filed on Apr. 19, 2021, provisional application No. 63/157,600, filed on Mar. 5, 2021, provisional application No. 63/157,351, filed on Mar. 5, 2021.

(51) Int. Cl.

| | | |
|---|---|---|
| *G06F 9/455* | (2018.01) | |
| *G06F 8/60* | (2018.01) | |
| *G06F 9/38* | (2018.01) | |
| *G06F 9/4401* | (2018.01) | |
| *G06F 9/48* | (2006.01) | |
| *G06F 9/54* | (2006.01) | |
| *G06F 11/34* | (2006.01) | |
| *G06F 30/331* | (2020.01) | |
| *G06N 20/00* | (2019.01) | |
| *H04B 7/0452* | (2017.01) | |
| *H04L 41/122* | (2022.01) | |
| *H04L 41/40* | (2022.01) | |
| *H04L 69/324* | (2022.01) | |
| *H04W 8/20* | (2009.01) | |
| *H04W 12/037* | (2021.01) | |
| *H04W 12/08* | (2021.01) | |
| *H04W 24/02* | (2009.01) | |
| *H04W 28/16* | (2009.01) | |
| *H04W 40/24* | (2009.01) | |
| *H04W 48/14* | (2009.01) | |
| *H04W 72/0453* | (2023.01) | |
| *H04W 72/044* | (2023.01) | |
| *H04W 72/20* | (2023.01) | |
| *H04W 72/29* | (2023.01) | |
| *H04W 72/51* | (2023.01) | |
| *H04W 72/52* | (2023.01) | |
| *H04W 28/086* | (2023.01) | |
| *H04W 36/10* | (2009.01) | |
| *H04W 84/04* | (2009.01) | |
| *G06F 9/50* | (2006.01) | |
| *H04L 67/125* | (2022.01) | |
| *H04L 67/565* | (2022.01) | |
| *H04L 67/61* | (2022.01) | |
| *G06F 11/30* | (2006.01) | |
| *H04W 72/542* | (2023.01) | |
| *H04L 41/5054* | (2022.01) | |
| *H04L 67/10* | (2022.01) | |
| *H04L 67/50* | (2022.01) | |
| *H04L 67/60* | (2022.01) | |
| *H04L 69/40* | (2022.01) | |
| *H04W 72/121* | (2023.01) | |
| *H04W 88/08* | (2009.01) | |
| *H04B 7/06* | (2006.01) | |
| *H04L 5/00* | (2006.01) | |

(52) U.S. Cl.
CPC ............ *H04L 41/122* (2022.05); *H04L 41/40* (2022.05); *H04L 43/10* (2013.01); *H04L 69/324* (2013.01); *H04W 8/18* (2013.01); *H04W 8/186* (2013.01); *H04W 8/20* (2013.01); *H04W 12/037* (2021.01); *H04W 12/08* (2013.01); *H04W 24/02* (2013.01); *H04W 28/0819* (2020.05); *H04W 28/16* (2013.01); *H04W 40/246* (2013.01); *H04W 48/14* (2013.01); *H04W 72/046* (2013.01); *H04W 72/0453* (2013.01); *H04W 72/20* (2023.01); *H04W 72/29* (2023.01); *H04W 72/51* (2023.01); *H04W 72/52* (2023.01); *G06F 2009/4557* (2013.01); *G06F 2009/45579* (2013.01); *G06F 2009/45583* (2013.01); *G06F 2009/45595* (2013.01); *H04L 2212/00* (2013.01); *H04W 36/10* (2013.01); *H04W 84/042* (2013.01)

(56) References Cited

U.S. PATENT DOCUMENTS

| | | |
|---|---|---|
| 9,124,538 B2 | 9/2015 | Koponen et al. |
| 9,438,491 B1 | 9/2016 | Kwok et al. |
| 10,111,163 B2 | 10/2018 | Vrzic et al. |
| 10,243,835 B2 | 3/2019 | Wang et al. |
| 10,447,597 B1 | 10/2019 | Kim et al. |
| 10,461,421 B1 | 10/2019 | Tran et al. |
| 10,555,134 B2 | 2/2020 | Shaw et al. |
| 10,609,530 B1 | 3/2020 | Patil et al. |
| 10,708,143 B2 | 7/2020 | Zhang et al. |
| 10,708,189 B1 | 7/2020 | Agrawal et al. |
| 10,735,331 B1 | 8/2020 | Li et al. |
| 10,834,669 B2 | 11/2020 | Bordeleau et al. |
| 10,856,217 B1 | 12/2020 | Young et al. |
| 10,939,369 B2 | 3/2021 | Bordeleau et al. |
| 11,009,372 B2 | 5/2021 | Klimenko |
| 11,012,288 B2 | 5/2021 | Kommula et al. |
| 11,024,144 B2 | 6/2021 | Bordeleau et al. |
| 11,108,643 B2 | 8/2021 | Kommula et al. |
| 11,146,964 B2 | 10/2021 | Bordeleau et al. |
| 11,178,016 B2 | 11/2021 | Kommula et al. |
| 11,240,113 B2 | 2/2022 | Kommula et al. |
| 11,246,087 B2 | 2/2022 | Bordeleau et al. |
| 11,483,762 B2 | 10/2022 | Bordeleau et al. |
| 11,522,764 B2 | 12/2022 | Kommula et al. |
| 11,540,287 B2 | 12/2022 | Singh et al. |
| 2003/0026205 A1 | 2/2003 | Mullendore et al. |
| 2006/0146712 A1 | 7/2006 | Conner et al. |
| 2007/0100981 A1 | 5/2007 | Adamczyk et al. |
| 2008/0162637 A1 | 7/2008 | Adamczyk et al. |
| 2010/0322255 A1 | 12/2010 | Hao et al. |
| 2013/0125230 A1 | 5/2013 | Koponen et al. |
| 2013/0279504 A1 | 10/2013 | Gulati et al. |
| 2014/0233385 A1 | 8/2014 | Beliveau et al. |
| 2015/0074264 A1 | 3/2015 | Izhak-Ratzin et al. |
| 2015/0163117 A1 | 6/2015 | Lambeth et al. |
| 2015/0381486 A1 | 12/2015 | Xiao et al. |
| 2015/0381493 A1 | 12/2015 | Bansal et al. |
| 2016/0335107 A1 | 11/2016 | Behera et al. |
| 2016/0344565 A1 | 11/2016 | Batz et al. |
| 2016/0353465 A1 | 12/2016 | Vrzic et al. |
| 2016/0360408 A1 | 12/2016 | Senarath et al. |
| 2017/0054595 A1 | 2/2017 | Zhang et al. |
| 2017/0085628 A1 | 3/2017 | Mahindra et al. |
| 2017/0093633 A1 | 3/2017 | Chang et al. |
| 2017/0111187 A1 | 4/2017 | Zanier et al. |
| 2017/0142591 A1 | 5/2017 | Vrzic |
| 2017/0250893 A1 | 8/2017 | Duda |
| 2017/0250906 A1 | 8/2017 | MeLampy et al. |
| 2017/0264483 A1 | 9/2017 | Lambeth et al. |
| 2017/0289791 A1 | 10/2017 | Yoo et al. |
| 2017/0332212 A1 | 11/2017 | Gage |
| 2017/0332421 A1 | 11/2017 | Sternberg et al. |
| 2018/0088972 A1 | 3/2018 | Kubota et al. |
| 2018/0183866 A1 | 6/2018 | Gunda et al. |
| 2018/0219762 A1 | 8/2018 | Wang et al. |
| 2018/0220276 A1 | 8/2018 | Senarath et al. |
| 2018/0220277 A1 | 8/2018 | Senarath et al. |
| 2018/0248770 A1 | 8/2018 | Regmi et al. |
| 2018/0270713 A1 | 9/2018 | Park et al. |
| 2018/0270743 A1 | 9/2018 | Callard et al. |
| 2018/0295036 A1 | 10/2018 | Krishnamurthy et al. |
| 2018/0332441 A1 | 11/2018 | Shaw et al. |
| 2018/0368060 A1 | 12/2018 | Kedalagudde et al. |
| 2019/0044755 A1 | 2/2019 | Takajo et al. |
| 2019/0053104 A1 | 2/2019 | Qiao et al. |
| 2019/0058508 A1 | 2/2019 | Yiu |
| 2019/0075082 A1 | 3/2019 | Adam et al. |
| 2019/0104458 A1 | 4/2019 | Svennebring et al. |
| 2019/0123963 A1 | 4/2019 | Tang et al. |
| 2019/0124704 A1 | 4/2019 | Sun et al. |

(56) References Cited

U.S. PATENT DOCUMENTS

| | | |
|---|---|---|
| 2019/0150080 A1 | 5/2019 | Davies et al. |
| 2019/0158364 A1 | 5/2019 | Zhang et al. |
| 2019/0159117 A1 | 5/2019 | Kuge et al. |
| 2019/0174573 A1 | 6/2019 | Velev et al. |
| 2019/0187999 A1 | 6/2019 | Lu et al. |
| 2019/0191309 A1 | 6/2019 | Kweon et al. |
| 2019/0200286 A1 | 6/2019 | Usui et al. |
| 2019/0268633 A1 | 8/2019 | Jayawardene et al. |
| 2019/0268973 A1 | 8/2019 | Bull et al. |
| 2019/0280976 A1 | 9/2019 | Wang |
| 2019/0287146 A1 | 9/2019 | Maitland et al. |
| 2019/0289470 A1 | 9/2019 | Vaidya et al. |
| 2019/0320494 A1 | 10/2019 | Jayawardene et al. |
| 2019/0364475 A1 | 11/2019 | Chandramouli |
| 2019/0370376 A1 | 12/2019 | Demmon et al. |
| 2019/0373520 A1 | 12/2019 | Sillanpää |
| 2020/0007445 A1 | 1/2020 | Anwer et al. |
| 2020/0053531 A1 | 2/2020 | Myhre et al. |
| 2020/0053545 A1 | 2/2020 | Wong et al. |
| 2020/0067831 A1 | 2/2020 | Spraggins et al. |
| 2020/0077327 A1 | 3/2020 | Duan et al. |
| 2020/0106536 A1 | 4/2020 | Bedekar |
| 2020/0120721 A1 | 4/2020 | Lau et al. |
| 2020/0120724 A1 | 4/2020 | Vaidya et al. |
| 2020/0137621 A1 | 4/2020 | Yang et al. |
| 2020/0213360 A1 | 7/2020 | Ojha et al. |
| 2020/0235990 A1 | 7/2020 | Janakiraman et al. |
| 2020/0252142 A1* | 8/2020 | Bedekar ............... H04W 24/10 |
| 2020/0273314 A1 | 8/2020 | Bordeleau et al. |
| 2020/0275281 A1 | 8/2020 | Bordeleau et al. |
| 2020/0275357 A1 | 8/2020 | Bordeleau et al. |
| 2020/0275358 A1 | 8/2020 | Bordeleau et al. |
| 2020/0275359 A1 | 8/2020 | Bordeleau et al. |
| 2020/0275360 A1 | 8/2020 | Bordeleau et al. |
| 2020/0280615 A1 | 9/2020 | Andersson et al. |
| 2020/0314029 A1 | 10/2020 | Gopinath et al. |
| 2020/0314622 A1 | 10/2020 | Tofighbakhsh et al. |
| 2021/0014912 A1* | 1/2021 | Song ..................... H04W 76/12 |
| 2021/0029580 A1 | 1/2021 | Gupta et al. |
| 2021/0037390 A1 | 2/2021 | Tofighbakhsh et al. |
| 2021/0051490 A1* | 2/2021 | Yanover ............... H04W 24/02 |
| 2021/0064407 A1 | 3/2021 | Kommula et al. |
| 2021/0064451 A1 | 3/2021 | Kommula et al. |
| 2021/0067416 A1 | 3/2021 | Kommula et al. |
| 2021/0067439 A1 | 3/2021 | Kommula et al. |
| 2021/0224145 A1* | 7/2021 | Warmack ............ G06F 9/44505 |
| 2021/0234803 A1 | 7/2021 | Parekh et al. |
| 2021/0297347 A1 | 9/2021 | Xu et al. |
| 2022/0038902 A1 | 2/2022 | Mueck |
| 2022/0167236 A1* | 5/2022 | Melodia ............ H04W 28/0236 |
| 2022/0210706 A1 | 6/2022 | Parekh et al. |
| 2022/0210708 A1 | 6/2022 | Parekh et al. |
| 2022/0225264 A1* | 7/2022 | Song ..................... H04W 92/12 |
| 2022/0237049 A1 | 7/2022 | Wiggers et al. |
| 2022/0279535 A1 | 9/2022 | Tsui |
| 2022/0283832 A1 | 9/2022 | Singh et al. |
| 2022/0283839 A1 | 9/2022 | Srinivasan et al. |
| 2022/0283840 A1 | 9/2022 | Jayavelu et al. |
| 2022/0283841 A1 | 9/2022 | Jayavelu et al. |
| 2022/0283842 A1 | 9/2022 | Singh et al. |
| 2022/0283843 A1 | 9/2022 | Singh |
| 2022/0283882 A1 | 9/2022 | Singh et al. |
| 2022/0286536 A1 | 9/2022 | Singh et al. |
| 2022/0286840 A1 | 9/2022 | Singh |
| 2022/0286914 A1 | 9/2022 | Gudipati et al. |
| 2022/0286915 A1 | 9/2022 | Gudipati et al. |
| 2022/0286916 A1 | 9/2022 | Yang et al. |
| 2022/0286939 A1 | 9/2022 | Gudipati et al. |
| 2022/0287038 A1 | 9/2022 | Singh et al. |
| 2022/0303831 A1 | 9/2022 | Song et al. |
| 2022/0342732 A1 | 10/2022 | Subramani Jayavelu et al. |
| 2022/0407664 A1 | 12/2022 | Wang et al. |
| 2023/0041056 A1 | 2/2023 | Bordeleau et al. |
| 2023/0054483 A1 | 2/2023 | Ee et al. |

FOREIGN PATENT DOCUMENTS

| | | |
|---|---|---|
| JP | 2018518927 A | 7/2018 |
| JP | 2018125837 A | 8/2018 |
| WO | 2016159192 A1 | 10/2016 |
| WO | 2016206742 A1 | 12/2016 |
| WO | 2017150642 A1 | 9/2017 |
| WO | 2019129374 A1 | 7/2019 |
| WO | 2019229492 A1 | 12/2019 |
| WO | 2020171957 A1 | 8/2020 |
| WO | 2020242987 A1 | 12/2020 |
| WO | 2021040935 A1 | 3/2021 |
| WO | 2022011862 A1 | 1/2022 |
| WO | 2022156887 A1 | 7/2022 |
| WO | 2022177333 A1 | 8/2022 |
| WO | 2022186883 A1 | 9/2022 |
| WO | 2022186912 A1 | 9/2022 |
| WO | 2022194359 A1 | 9/2022 |

OTHER PUBLICATIONS

Non-Published Commonly Owned U.S. Appl. No. 17/376,758, filed Jul. 15, 2021, 50 pages, VMware, Inc.
Non-Published Commonly Owned U.S. Appl. No. 17/376,766, filed Jul. 15, 2021, 50 pages, VMware, Inc.
Non-Published Commonly Owned U.S. Appl. No. 17/376,785, filed Jul. 15, 2021, 50 pages, VMware, Inc.
Non-Published Commonly Owned U.S. Appl. No. 17/376,801, filed Jul. 15, 2021, 36 pages, VMware, Inc.
Non-Published Commonly Owned U.S. Appl. No. 17/376,817, filed Jul. 15, 2021, 36 pages, VMware, Inc.
Non-Published Commonly Owned U.S. Appl. No. 17/376,835, filed Jul. 15, 2021, 36 pages, VMware, Inc.
Non-Published Commonly Owned Related U.S. Appl. No. 17/384,476 with similar specification, filed Jul. 23, 2021, 56 pages, VMware, Inc.
Non-Published Commonly Owned U.S. Appl. No. 17/384,777, filed Jul. 25, 2021, 87 pages, VMware, Inc.
Non-Published Commonly Owned U.S. Appl. No. 17/384,778, filed Jul. 25, 2021, 87 pages, VMware, Inc.
Non-Published Commonly Owned U.S. Appl. No. 17/384,779, filed Jul. 25, 2021, 87 pages, VMware, Inc.
Non-Published Commonly Owned U.S. Appl. No. 17/384,780, filed Jul. 25, 2021, 87 pages, VMware, Inc.
Non-Published Commonly Owned U.S. Appl. No. 17/384,781, filed Jul. 25, 2021, 87 pages, VMware, Inc.
Non-Published Commonly Owned U.S. Appl. No. 17/384,782, filed Jul. 25, 2021, 87 pages, VMware, Inc.
Non-Published Commonly Owned U.S. Appl. No. 17/384,784, filed Jul. 25, 2021, 87 pages, VMware, Inc.
Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3.
Czichy, Thoralf, 5G RAN Optimization Using the O-RAN Software Community's RIC (Ran Intelligent Controller), Open Networking Summit Europe, Sep. 23, 2019, 23 pages, The Linux Foundation, Antwerp, Belgium.
PCT International Search Report and Written Opinion of Commonly Owned International Patent Application PCT/US2021/065172, dated Apr. 25, 2022, 15 pages, International Searching Authority (EPO).
Non-Published Commonly Owned Related International Patent Application PCT/US2021/065172 with similar specification, filed Dec. 24, 2021, 56 pages, VMware, Inc.
Author Unknown, "Open RAN 101—Role of RAN Intelligent Controller: Why, what, when, how?," Jul. 30, 2020, 8 pages.
Author Unknown, "O-RAN Operations and Maintenance Architecture," O-RAN WG1 OAM-Architecture-v04.00, Month Unknown 2021, 55 pages, O-RAN Alliance.
Author Unknown, "5G RIC—RAN Intelligent Controller," Jun. 26, 2020, 4 pages, retrieved from http://www.techplayon.com/5g-ric-ran-intelligent-controller/.

(56) References Cited

OTHER PUBLICATIONS

Non-Published Commonly Owned U.S. Appl. No. 17/971,590, filed Oct. 22, 2022, 104 pages, VMware, Inc.
Non-Published Commonly Owned U.S. Appl. No. 17/976,788, filed Oct. 29, 2022, 62 pages, VMware, Inc.
Balasubramanian, Bharath, et al., "RIC: A RAN Intelligent Controller Platform for AI-Enabled Cellular Networks," Apr. 16, 2021, 11 pages, IEEE.
Schmidt, Robert, "RAN Engine: Service-Oriented RAN Through Containerized Micro-Services," IEEE Transactions on Network and Service Management, Mar. 2021, 14 pages, vol. 18, No. 1, IEEE.

* cited by examiner

CLOUDIFIED USER-LEVEL TRACING

CLAIM OF BENEFIT TO PRIOR APPLICATIONS

This application claims the benefit of U.S. Provisional Patent Application 63/157,351, filed Mar. 5, 2021; U.S. Provisional Patent Application 63/157,600, filed Mar. 5, 2021; U.S. Provisional Patent Application 63/176,859, filed Apr. 19, 2021; and U.S. Provisional Patent Application 63/180,627, filed Apr. 27, 2021. U.S. Provisional Patent Applications 63/157,351, 63/157,600, 63/176,859, and 63/180,627 are incorporated herein by reference.

BACKGROUND

In telecommunications networks, the Radio Access Network (RAN) performs more and more functions with each iteration of the telecommunications standards. That is, in order to enable the advantages of 5G over previous standards, the 5G RAN performs various additional functions. These RAN functions are situated between user devices and the core network and are thus often performed at the base stations (e.g., cell towers) where computing power can be limited.

BRIEF SUMMARY

Some embodiments provide a method for offloading medium access control (MAC) scheduler and/or user-level tracing operations in an Open Radio Access (O-RAN) network to a set of applications that execute on machines deployed on a host computer in a cloud (e.g., a software-defined datacenter). These applications receive data from O-RAN components (e.g., Distributed Unit (O-DU) and/or Centralized Unit (O-CU) components) via a distributed near real-time RAN intelligent controller (RIC) and use the received data to perform their respective operations. For instance, the MAC scheduler application(s) generate MAC scheduling output (e.g., related to at least one 5G user) while the user-level tracing application(s) generate information related to traffic performance for at least one 5G user. In some embodiments, the MAC scheduler application(s) provide the generated MAC scheduling output back to the RAN via the RIC, while the user-level tracing application(s) provide data to the RIC (e.g., for use by another application, including the MAC scheduler application(s)).

In some embodiments, to enable the interaction of the applications with the RIC, machines (e.g., VMs, containers, etc.) are deployed on a host computer. On each machine, a control plane application (e.g., the MAC scheduler applications, user level tracing applications, other control plane applications) is deployed. In addition, a RIC software development kit (SDK) is configured on each of the machines to serve as an interface between the control plane application on the same machine and the RAN. The RIC SDK provides a set of connectivity APIs (e.g., a framework) through which applications (e.g., the control plane applications) can communicate with the distributed near real-time (RT) RIC. In some embodiments, the RIC framework on each machine includes a set of network connectivity processes that establish network connections to the set of E2 nodes for the control plane application.

In addition to communicating with the DU and/or CU (also referred to as E2 nodes in reference to the E2 interface between these components and the RIC) via the RIC framework, in some embodiments the control plane applications connect with network elements of the RIC. These network elements may include at least one shared data layer (SDL) element in some embodiments that provides access to a shared SDL storage of the RIC. Some embodiments deploy an SDL cache on the same host computer as a control plane application (e.g., on the same machine or on the host computer outside of the machine on which the control plane application is deployed) and use this cache to process at least a subset of the SDL storage access requests of the control plane application. In some embodiments, multiple control plane applications executing on the same host computer use a common SDL cache on that host computer. In some embodiments, the data stored in the SDL cache is synchronized with data stored in the SDL storage (e.g., a database). When the RIC framework is unable to process SDL access requests through the SDL cache, the RIC or the RIC framework forwards the SDL access requests to the SDL storage.

Through the RIC, the RIC framework also connects the control plane application to other control plane applications executing on other machines in some embodiments (deployed on different host computers or on the same host computer). For instance, some embodiments deploy several RICs to execute on several host computers to implement a distributed RIC that serves as a communication interface between the control plane applications.

To receive data from the E2 nodes, in some embodiments an application subscribes to a specific type of data with an E2 node, via the RIC. The application sends a subscription request to the RIC (e.g., via the set of connectivity APIs), which records the request and generates a subscription request to send via the E2 interface. The RIC sends this subscription request to the correct E2 node (or set of E2 nodes, if the information should be received from numerous E2 nodes, such as a set of DUs at different base stations) and stores subscription forwarding information. When the E2 nodes send a subscription acknowledgement back to the RIC, the RIC uses the subscription forwarding information to provide confirmation to the correct application.

The stored subscription forwarding information is also used by the RIC to route runtime data received from the E2 nodes based on the subscriptions to the correct application(s) and to route output data (e.g., generated by the MAC scheduler applications) to the correct E2 nodes. When one or more applications are subscribed to a particular type of data with an E2 node, that node sends the data to the RIC (e.g., as the data becomes available). The RIC uses the subscription forwarding information to route the data to any applications subscribing to the data.

The output data from the MAC scheduler and user-level tracing applications may be sent back to an E2 node (e.g., either the same E2 node from which the application received data or a different E2 node) or to another application. For instance, many MAC scheduler applications perform functions previously handled by the DU, taking advantage of the greater processing power available in cloud datacenters as compared to a wireless base station. In this case, the MAC scheduler application generates its output based on data received from the DU and sends the output back to the RIC. The RIC uses stored forwarding information to correctly forward the output data to the DU for the DU to use to perform RAN functions (e.g., beamforming for mobile devices connected to the base station).

When one application (e.g., a user-level tracing application) sends its output data to another application, this communication occurs through the RIC framework in some embodiments. If the first application sends its output data to the other application directly, in some embodiments a messaging infrastructure of the RIC framework handles this communication. In other cases, however, the output data is stored into the SDL storage by the first application. This allows the other application to retrieve the data via the SDL on an as-needed basis.

Different examples of MAC scheduler applications include a UE-specific beamforming weight application, a UE radio frequency (RF) condition prediction application, and a multi-user multi-input multi-output (MU-MIMO) pairing suggestion application. Each of these applications receives specific types of data from the DU (via the E2 interface and the RIC framework) and provides its output data to the DU. These applications may also receive other information (e.g., to perform more complex operations than would be available at the DU) from other sources (e.g., other applications, such as the user-level tracing applications).

For the UE-specific beamforming weight application, in some embodiments the DU exposes a report interface by which to provide an uplink Sounding Reference Signal (UL SRS) channel response matrix that is an input to the weight calculation function performed by this application. The beamforming weight application computes a UE-specific beamforming matrix, which is provided to the DU via an exposed control interface.

For the UE RF condition prediction application, in some embodiments the DU exposes a report interface by which to provide a downlink (DL) channel condition report that is an input to the RF condition prediction function performed by this application. The UE RF condition prediction application computes a predicted DL channel condition (e.g., including DL signal to interference and noise ratio (SINR), precoder matrix indicator (PMI), and rank) for the next scheduling window, which is provided to the DU via an exposed control interface.

For the MU-MIMO pairing suggestion application, in some embodiments the DU exposes a report interface by which to provide UE-specific beamforming matrices that are inputs to the pairing suggestion function performed by this application. The MU-MIMO pairing suggestion application computes a UE pairing suggestion and SINR impact assessment, which are provided to the DU via an exposed control interface.

The user-level tracing applications of some embodiments generate information related to traffic performance and/or user configuration for at least one user. This tracing data can be used as inputs to various control plane algorithms at other applications and/or the E2 nodes, including some or all of the MAC scheduler operations, parameter setting applications, etc. These tracing applications can (i) track user behavior in a cell, (ii) track user RF condition, (iii) track user data traffic performance in different layers (MAC, Radio Link Control (RLC), Packet Data Convergence Protocol (PDCP)), and/or (iv) track user RF resource consumption.

For the user-level tracing applications, in some embodiments the DU exposes report interfaces to provide various metrics to the user-level tracing operations. These metrics can include selected Radio Resource Control (RRC) messages, MAC/RLC/PDCP traffic volume and performance, RF condition, and RF resource consumption. In some embodiments, messages over these interfaces to the RIC are triggered based on user behavior and/or periodic reporting. The tracing operations track the various user data indicated above and can provide this information either back to the E2 nodes or to other control applications operating at the RIC (e.g., the MAC scheduler applications). For instance, these applications might perform analysis on the user data performance received from the user-level tracing applications, determine that certain performance is inadequate, and modify how the RAN is treating the user traffic.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
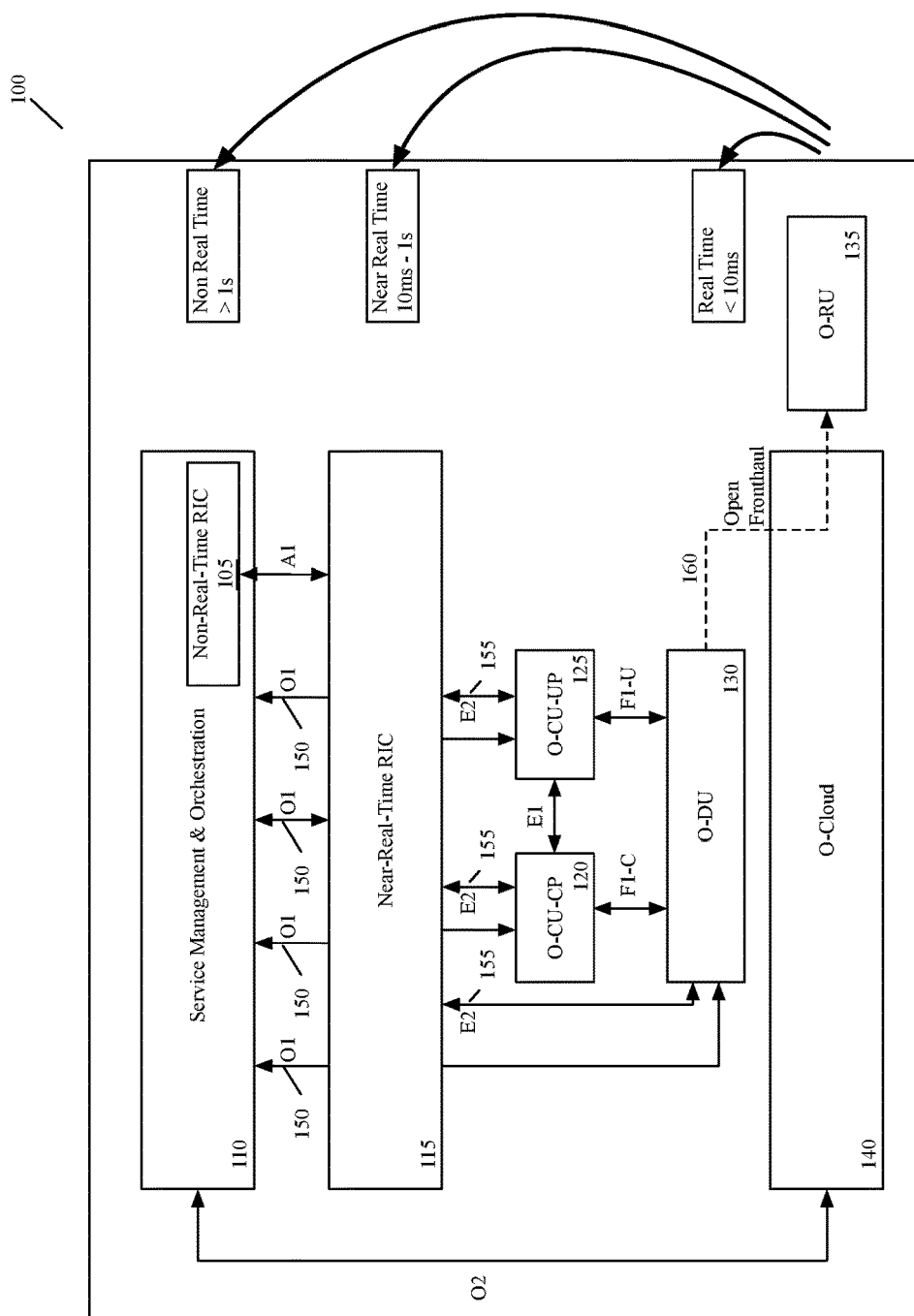
FIG. 1 illustrates an example of O-RAN architecture according to some embodiments.
Figure 1:
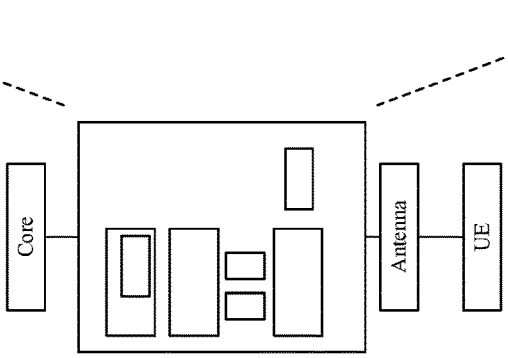

Today, there is a push to have RAN implemented as O-RAN, a standard for allowing interoperability for RAN elements and interfaces. FIG. 1 illustrates an example of O-RAN architecture 100, according to some embodiments. The O-RAN architecture 100 includes a service management and orchestration framework (SMO) 110 with a non-real-time RIC 105, a near real-time RAN intelligent controller (RIC) 115, an open central unit control plane (O-CU-CP) 120, an open central unit user plane (O-CU-UP) 125, open distributed unit (O-DU) 130, an open radio unit (O-RU) 135, and an O-Cloud 140. The O-CU-CP 120, the O-CU-UP 125, and the O-DU 130 may be collectively referred to as the managed functions 120-130 below.

As defined in the standard, the SMO 110 in some embodiments includes an integration fabric that allows the SMO to connect to and manage the RIC 115, the managed functions 120-130, and the O-Cloud 140 via the open interfaces 150. Unlike these elements, the O-RU 135 is not managed by the SMO 110, and is instead managed by the O-DU 130, as indicated by the dashed line 160, in some embodiments. In some embodiments, the O-RU 135 processes and sends radio frequencies to the O-DU 130.

In some embodiments, the managed functions 120-130 are logical nodes that each host a set of protocols. According to the O-RAN standard, for example, the O-CU-CP 120, in some embodiments, include protocols such as radio resource control (RRC) and the control plane portion of packet data convergence protocol (PDCP), while the O-CU-UP 125 includes protocols such as service data adaptation protocol (SDAP), and the user plane portion of PDCP.

The two RICs are each adapted to specific control loop and latency requirements. The near real-time RIC (near-RT RIC) 115 provides programmatic control of open centralized units (O-CUs) and open distributed units (O-DUs) on time cycles of 10 ms to 1 second. The non-real-time RIC (non-RT RIC) 105, on the other hand, provides higher layer policies that can be implemented in the RAN either via the near-RT RIC 115 or via a direct connection to RAN nodes. The non-RT RIC is used for control loops of more than 1 second. Each RIC 105 or 115 serves as a platform on which RAN control applications execute. These applications can be developed by third-party suppliers that are different from the RIC vendors. These applications are referred to as "xApps" (for the near-RT RIC 115) and "rApps" (for the non-RT RIC 105).

The near real-time RIC 115, in some embodiments, is a logical aggregation of several functions that use data collection and communications over the interfaces 155 in order to control the managed functions 120-130. In some embodiments, the non-real-time RIC 105 uses machine learning and model training in order to manage and optimize the managed functions 120-130. The near-RT RIC 115 in some of these embodiments also uses machine learning.

In some embodiments, the O-Cloud 140 is responsible for creating and hosting virtual network functions (VNFs) for use by the near-RT RIC 115 and the managed functions 120-130. In some embodiments, the DU is in charge of per-slot decisions of user scheduling and includes a RAN scheduler that performs MAC control assistance and user-level tracing. In order to increase computing power available in the cloud (i.e., compared to base stations that typically execute the RAN functions), the RIC is implemented in one or more public and/or private cloud datacenters and implements MAC scheduling and user-level tracing, thereby offloading these functions from the DU to the RIC. The interfaces 155 in some embodiments enable the RAN to provide inputs to the functions at the RIC, and, at least in some embodiments, receive outputs that have been computed by these functions at the RIC.

Figure 2:
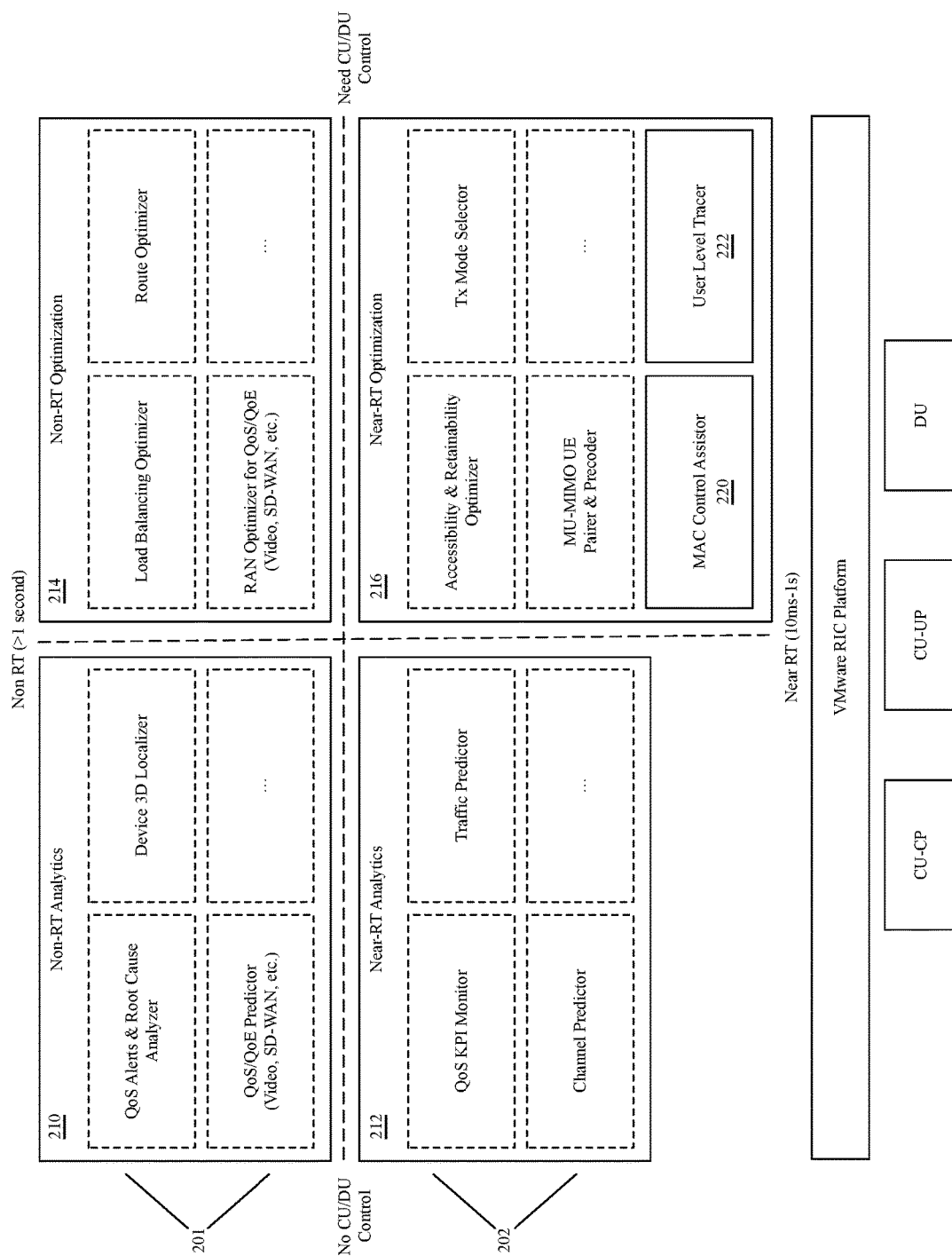
FIG. 2 illustrates an in-depth view of the components of both a non-real-time RIC and a near real-time RIC according to some embodiments.

FIG. 2 illustrates an in-depth view of the components of both a non-real-time RIC 201 and a near real-time RIC 202. Each of the RICs 201 and 202 includes a respective set of analytics functions 210 and 212, and a respective set of optimization functions 214 and 216, which are each illustrated with dashed lines to indicate they are existing components. In addition to these existing components, the near real-time optimization functions 216 includes two new components, the MAC control assistor 220 and user-level tracer 222, illustrated with solid lines to visually differentiate them from the existing components. In some embodiments, these components are part of a larger MIMO component (e.g., along with the MU-MIMO UE pairer and precoder).

In some embodiments, the MAC control assistor 220 can include various functions such as (1) User Equipment (UE)-specific beamforming weight calculation based on UL SRS channel signal reception, (2) UE Radio Frequency (RF) condition prediction, and (3) Multi-User, Multiple Input, Multiple Output (MU-MIMO) pairing suggestion for the MAC scheduler based on the UE-specific beams. For each of these functions, some embodiments expose a report interface (that provides input data for the function to the RIC from the DU) and a control interface (that provides output data for the function to the DU from the RIC).

The user-level tracer 222, in some embodiments, produces L1/L2/L3 level information related to user configuration and traffic performance. This tracing data can be used as inputs to various control algorithms, including the MAC scheduler, parameter setting, etc. The user-level tracer 222 can include tracing operations that can (i) track user behavior in a cell, (ii) track user RF condition, (iii) track user data traffic performance in different layers (MAC, Radio Link Control (RLC), Packet Data Convergence Protocol (PDCP)), and (iv) track user RF resource consumption.

Figure 3:
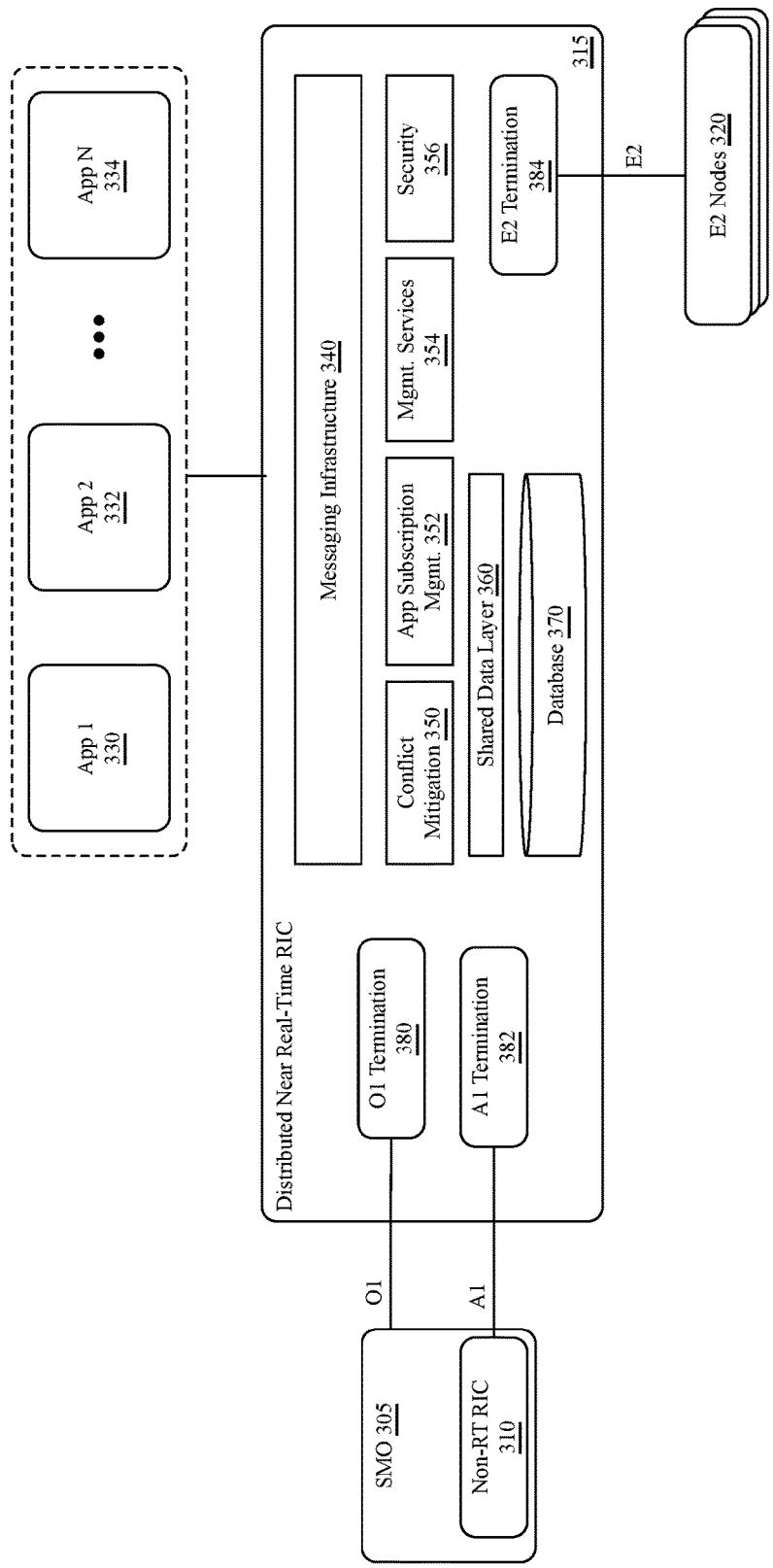
FIG. 3 illustrates another view of the O-RAN architecture of some embodiments, with a more in-depth view of the near real-time RIC.

FIG. 3 illustrates another view of the O-RAN architecture of some embodiments, with a more in-depth view of the near real-time RIC. The architecture 300 includes an SMO 305 with a non-real-time RIC 310, a distributed near real-time RIC 315, and E2 nodes 320 (e.g., O-DU and/or O-CU nodes). The distributed near real-time RIC 315 includes messaging infrastructure 340, a set of services (e.g., 350, 352, 354, and 356), a shared data layer 360, a database 370, and a set of termination interfaces (e.g., 380, 382, and 384). As shown, a set of embedded apps (e.g., 330, 332, and 334) uses this distributed near-RT RIC 315. As further described below, the distributed near-RT RIC 315 is implemented by multiple RICs executing on multiple host computers in some embodiments.

As shown, the set of services include conflict mitigation services 350, app subscription management services 352, management services 354, and security services 356. Additionally, the set of termination interfaces include O1 termination interface 380 connecting the SMO 305 to the near real-time RIC 315, A1 termination interface 382 connecting the non-real-time RIC 310 to the near real-time RIC 315, and E2 termination interface 384 connecting the E2 nodes 320 to the near real-time RIC 315. Each of the apps, in some embodiments, is representative of the various functions of the near-RT RIC 315 that use data sent from the E2 nodes 320.

In some embodiments, the objective of the framework 300 is to offload near real-time functions that are computation-intensive, and provide results back to the O-DU (e.g., via the E2 interface with E2 nodes 320). The results, in some embodiments, can be used to assist or enhance the real-time decision in the MAC layer.

On each machine (e.g., each VM or Pod) that executes a control plane application, some embodiments configure a RIC SDK to serve as an interface between the control plane application on the machine and a set of one or more elements of the RAN. In some embodiments, the RIC SDK provides a set of connectivity APIs (e.g., a framework) through which applications can communicate with the distributed near real-time (RT) RIC implemented by two or more near real-time RICs. Examples of such applications include xApps, and other control plane and edge applications in some embodiments. In O-RAN, xApps perform control plane, monitoring, and data processing operations. The discussion below regarding FIGS. 4 and 6-20 refers to control plane applications (e.g., 415, 615, 620, 715, 720, etc.). These control plane applications are xApps in an O-RAN system in some embodiments.

Figure 4:
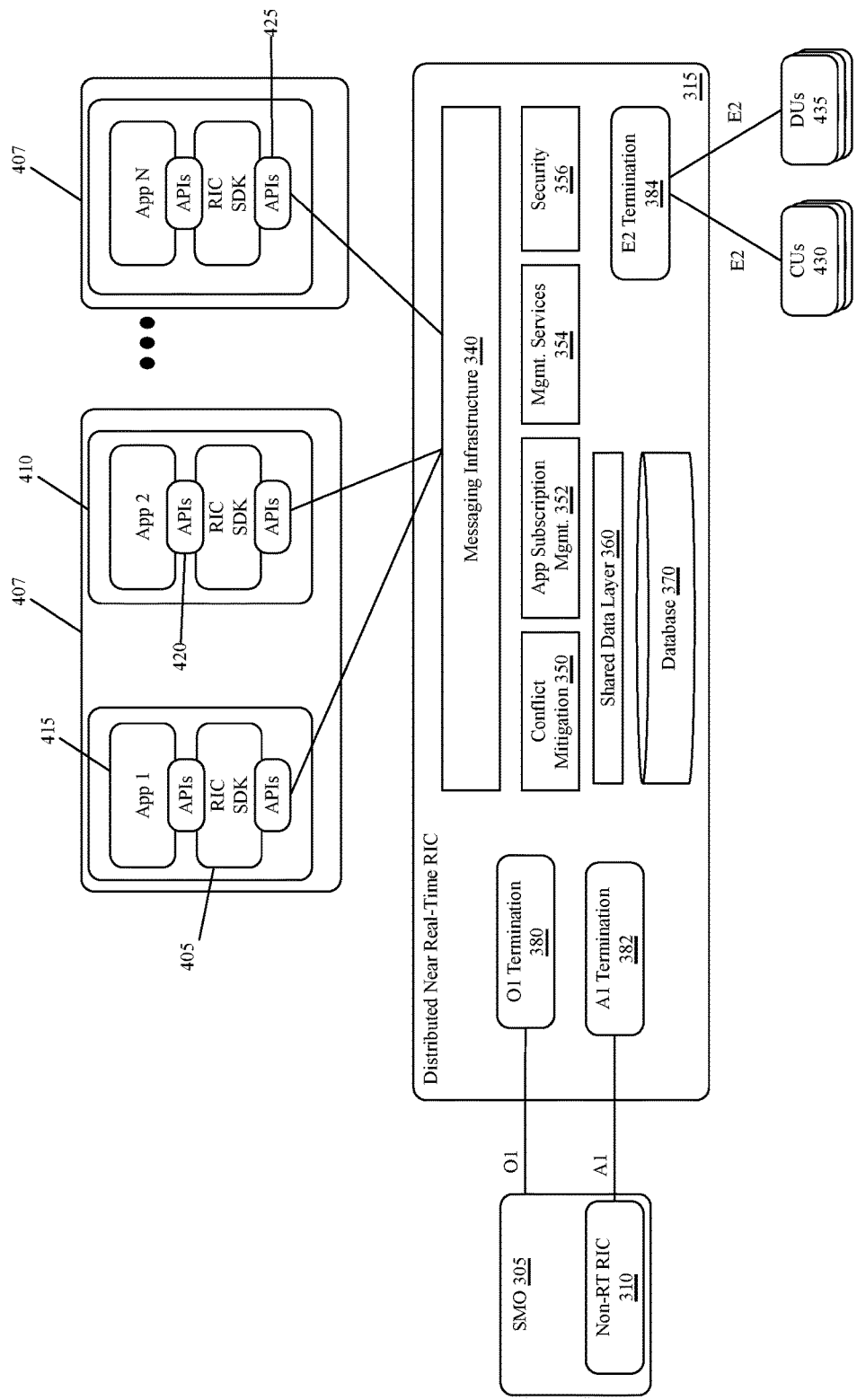
FIG. 4 illustrates deployment of RIC SDKs on machines that execute control plane applications in some embodiments.

FIG. 4 illustrates deployment of RIC SDKs 405 on machines 410 that execute control plane applications 415 in some embodiments. As shown, one or more machines 410 execute on each of several host computers 407 in one or more datacenters. In some embodiments, the RIC SDK 405 on each machine 410 includes a set of network connectivity processes that establish network connections to the set of RAN elements (e.g., E2 nodes 320, shared data layer 360, management services 354, SMO 305, etc.) for the control plane application. The RIC SDK processes allow the control plane application on their machine to forego performing network connectivity operations. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level APIs 420 that the RIC SDK converts into low-level APIs 425. In some embodiments, at least a subset of the low-level API calls 425 are specified by a standard specifying body. Also, in some embodiments, the high-level APIs 420 are made in a high-level programming language (e.g., C++), while the low-level API calls comprise low-level calls that establish and maintain network connections and pass data packets through these connections.

The set of RAN elements that the RIC SDK connects with the control plane application on its machine in some embodiments include RAN elements that are produced and/or developed by different RAN vendors and/or developers. These RAN elements include CUs 430 and DUs 435 of the RAN in some embodiments. Also, this SDK communicates with the CUs and DUs through the low-level, standard-specified E2 interface, while the control plane application on the machine uses high-level API calls to communicate with the CUs and DUs through the RIC SDK. In some embodiments, the high-level API calls specifying E2 interface operations at a high-level application layer that do not include low-level transport or network operations.

Figure 5:
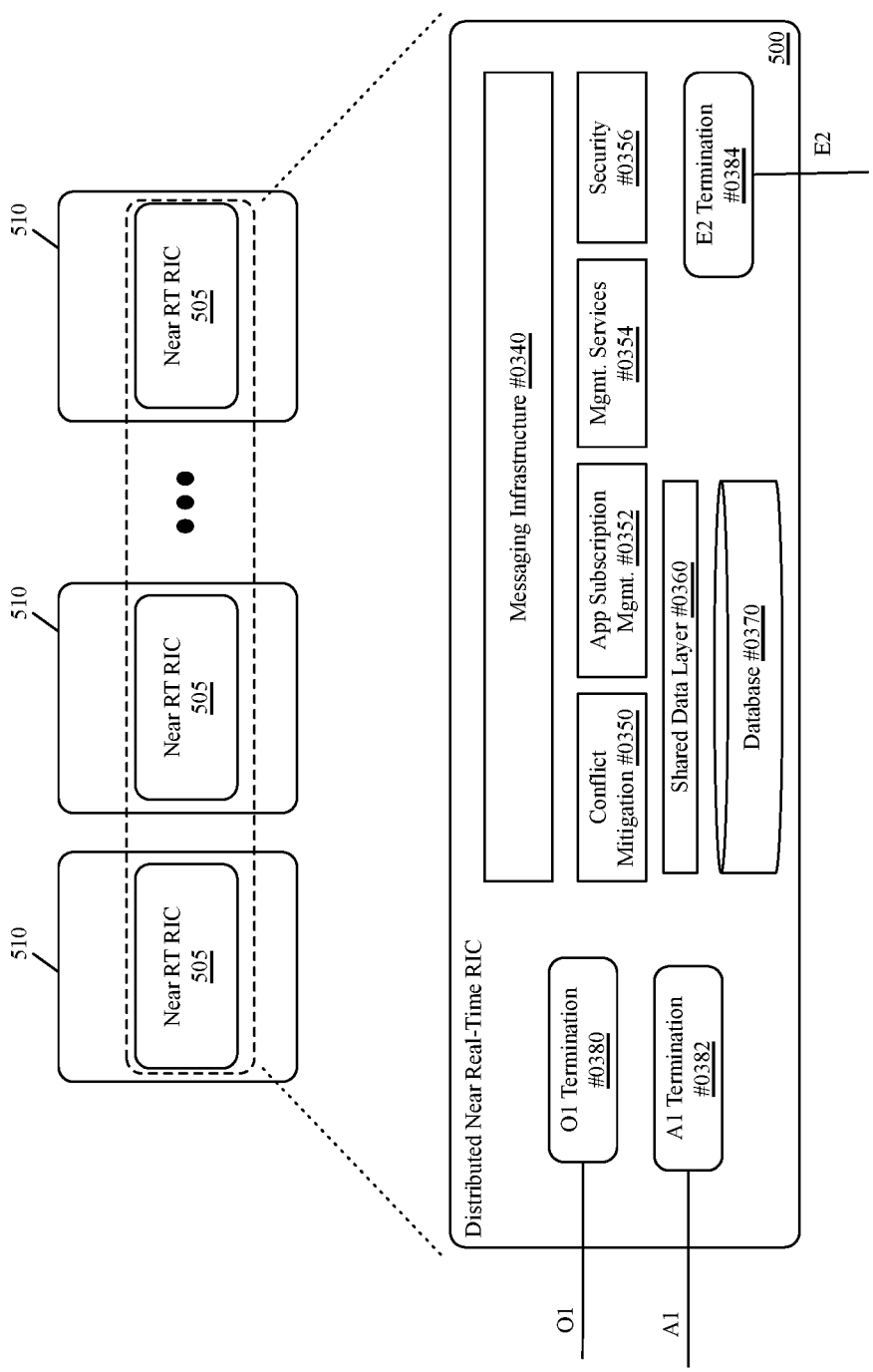
FIG. 5 illustrates that some embodiments deploy several RICs to execute on several host computers to implement a distributed near-RT RIC that includes the RIC components illustrated in FIGS. 3 and 4.

Conjunctively, or alternatively, the set of RAN elements that the RIC SDK connects with the control plane application 415 on its machine 410 include network elements of the RIC. Again, these network elements in some embodiments include RAN elements that are produced and/or developed by different RAN vendors and/or developers. These RIC elements in some embodiments include shared data layer (SDL) 360, datapath input/output (I/O) elements, and application and management services 352 and 354 in some embodiments. FIG. 5 illustrates that some embodiments deploy several near-RT RICs 505 to execute on several host computers 510 to implement a distributed near-RT RIC 500 that includes the RIC components illustrated in FIGS. 3 and 4. In some embodiments, one RIC 505 executes on each host computer that also executes a control plane application 415. In other embodiments, a control plane application 415 can execute on a host computer that does not execute a RIC. For instance, in some embodiments, one or more control plane applications execute on one or more host computers that have graphics processing units (GPUs), while RICs do not execute on such host computers as they do not need the processing power of the GPUs.

Through the distributed near-RT RIC, the RIC SDK also connects its control plane application to other control plane applications executing on other machines. In other words, the RIC SDK and the distributed near-RT RIC in some embodiments serve as a communication interface between the control plane applications. In some embodiments, the different control plane applications are developed by different application developers that use the common set of RIC APIs to communicate with each other through the distributed near-RT RIC. In some of these embodiments, the distributed near-RT RIC adds one or more parameters to the API calls as it forwards the API calls from one control application to the other control application.

Figure 6:
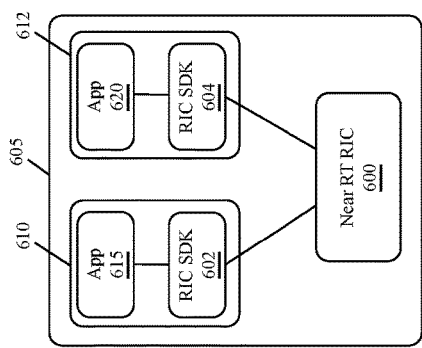
FIG. 6 illustrates a RIC that executes on one host computer along with two machines on which two control plane applications execute.

FIGS. 6-11 illustrate several examples of RIC architectures in which the RIC SDK and the distributed near-RT RIC establish the communication interface between control plane applications. These architectures are mutually exclusive in some embodiments, while in other embodiments two or more of these architectures are used conjunctively. FIG. 6 illustrates a near-RT RIC 600 that executes on one host computer 605 along with two machines 610 and 612 on which two control plane (CP) applications 615 and 620 execute. Through the RIC SDKs 602 and 604 executing on the machines 610 and 612, the RIC 600 receives API calls from the CP application 615 and forwards the API calls to the CP application 620, and passes responses to these API calls from the second CP application 620 to the first CP application 615. It also passes API calls from the second CP application 620 to the first CP application 615, and responses from the first CP application 615 to the second CP application 620.

Figure 7:
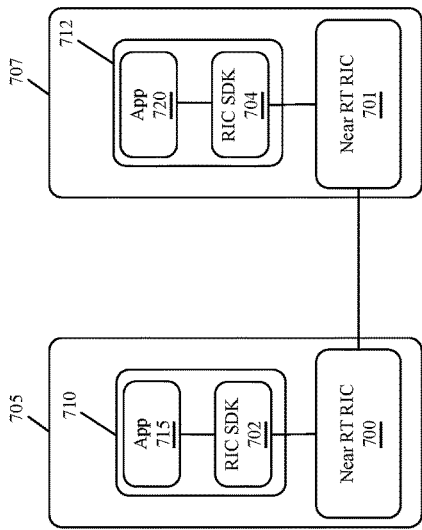
FIG. 7 illustrates two RICs that execute on two host computers along with two machines on which two control plane applications and two RIC SDKs execute.

FIG. 7 illustrates two near-RT RICs 700 and 701 that execute on two host computer 705 and 707 along with two machines 710 and 712 on which two control plane applications 715 and 720 and two RIC SDKs 702 and 704 execute. As shown, API calls from the first CP application 715 to the second CP application 720 are forwarded through the first RIC SDK 702, the first RIC 700, the second RIC 701 and the second RIC SDK 704. The second CP application's responses to these API calls to the first CP application 715 traverse the reverse path from the second RIC SDK 704, the second RIC 701, the first RIC 700, and the first RIC SDK 702.

The API calls from second CP application 720 to the first CP application 715 are forwarded through the second RIC SDK 704, the second RIC 701, the first RIC 700, and the first RIC SDK 702, while responses to these API calls from the first CP application 715 to the second CP application 720 are forwarded through the first RIC SDK 702, the first RIC 700, the second RIC 701 and the second RIC SDK 704.

Figure 8:
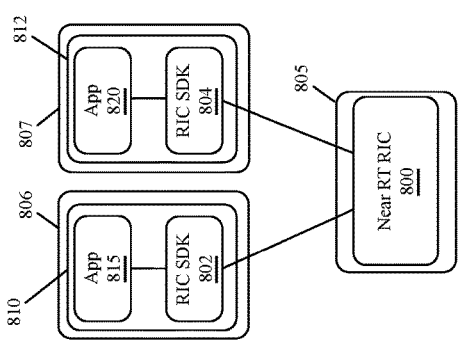
FIG. 8 illustrates a RIC that executes on a first host computer to connect two control plane applications that execute on two machines operating on two other host computers.

FIG. 8 illustrates a near-RT RIC 800 that executes on first host computer 805 to connect two control plane applications 815 and 820 that execute on two machines 810 and 812 operating on two other host computers 806 and 807. Through the RIC SDKs 802 and 804 executing on the machines 810 and 812, the RIC 800 receives API calls from the CP application 815 and forwards the API calls to the CP application 820, and passes responses to these API calls from the second CP application 820 to the first CP application 815. It also passes API calls from the second CP application 820 to the first CP application 815, and responses from the first CP application 815 to the second CP application 820.

Figure 9:
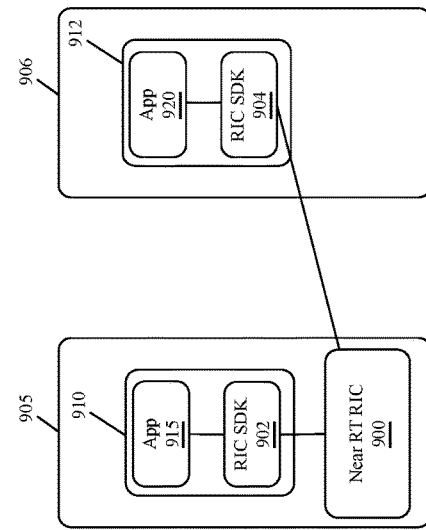
FIG. 9 illustrates a RIC that executes on a first host computer to connect two control plane applications that execute on two machines, one of which operates on the first host computer while the other operates on another host computer.

FIG. 9 illustrates a near-RT RIC 900 that executes on first host computer 905 to connect two control plane applications 915 and 920 that execute on two machines 910 and 912 one of which operates on host computer 905 while the other operates on host computer 906. Through the RIC SDKs 902 and 904 executing on the machines 910 and 912, the RIC 900 receives API calls from the CP application 915 and forwards the API calls to the CP application 920, and passes responses to these API calls from the second CP application 920 to the first CP application 915. Through these SDKs 902 and 904, the RIC 900 also passes API calls from the second CP application 920 to the first CP application 915, and responses from the first CP application 915 to the second CP application 920.

Figure 10:
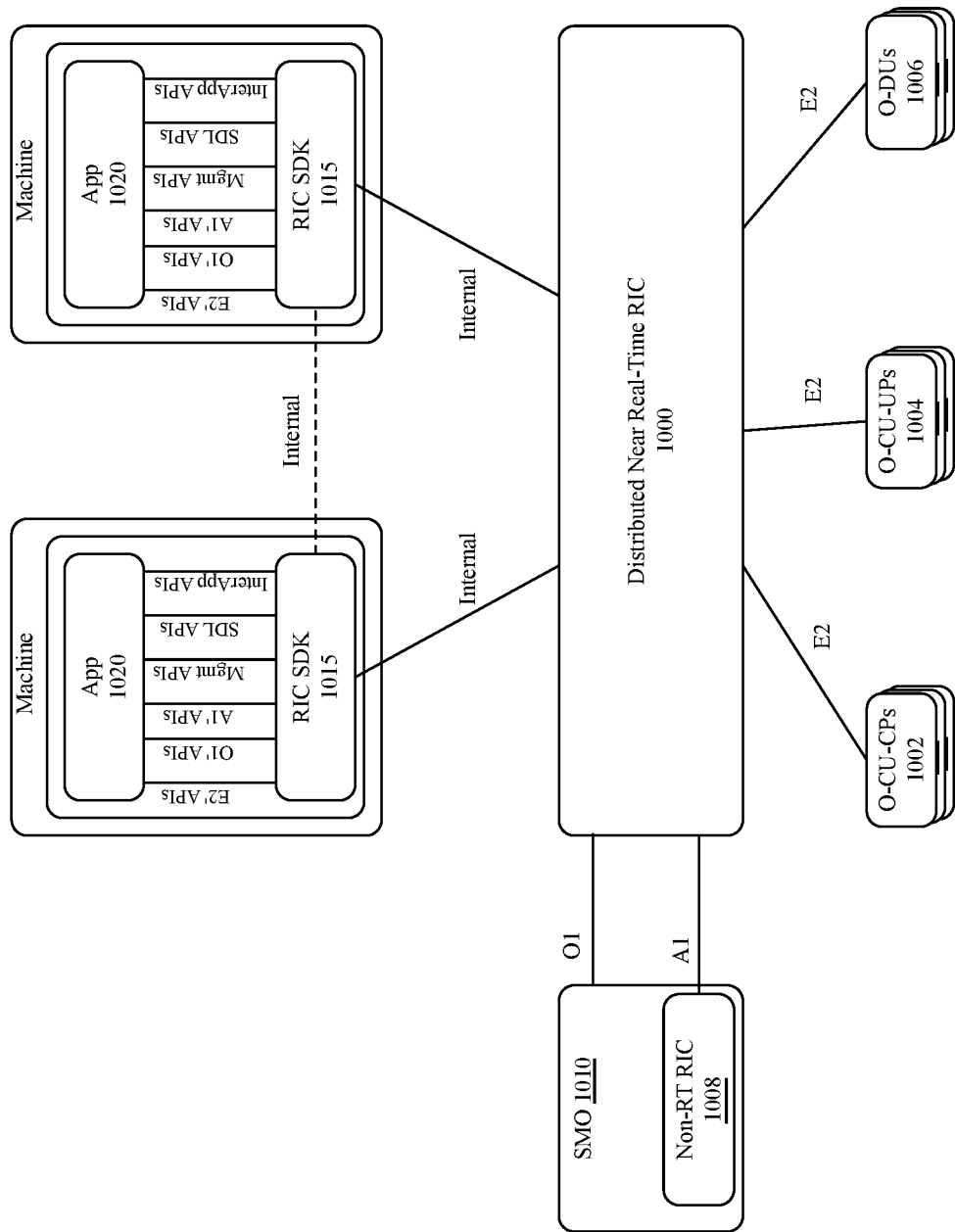
FIG. 10 illustrates examples of the different standard specified APIs that the distributed near-RT RIC platform of some embodiments supports.

FIG. 10 illustrates examples of the different standard specified APIs that the distributed near-RT RIC platform of some embodiments supports. As shown, the distributed near-RT RIC platform 1000 in some embodiments uses the E2, O1, and A1 interfaces specified by the O-RAN standard specifying body. It uses the E2 APIs to communicate with the E2 O-RAN nodes, such as the O-CU-CPs 1002, O-CU-UPs 1004, and O-DUs 1006. It also uses the A1 APIs to communicate with the non-real-time RIC platform 1008 and uses the O1 APIs to communicate the SMO 1010.

For each of these E2, A1, and O1 APIs, the RIC SDKs 1015 provide high-level counterpart APIs for the control plane applications 1020 that use the RIC SDKs and the distributed near-RT RIC 1000 platform to communicate with the E2 nodes 1002-1006, the non-real-time RIC platform 1008 and the SMO 1010. FIG. 10 designates these high-level counterpart APIs for the E2, O1, and A1 interfaces with a prime sign as the E2' API calls, O1' API calls, and A1' API calls. These high-level counterpart APIs are not specified by a standard body but are APIs that the RIC SDK and/or distributed near-RT RIC convert into standard specified API calls.

FIG. 10 also shows several internal-RIC APIs for allowing the control plane applications 1020 to communicate with each other through the RIC SDKs and the distributed near-RT RIC, and to communicate with one or more elements of the distributed near0RT RIC (e.g., shared data layer (SDL) 360, datapath input/output (I/O) elements, and application and management services 352 and 354).

Enablement APIs are the APIs that are used in some embodiments to allow the control plane applications 1020 to communicate with each other. As described above by reference to FIGS. 6-9, these APIs are passed through the distributed near-RT RIC in some embodiments. In other embodiments, these APIs allow the RIC SDKs of the control plane applications to directly communicate with each other without traversing through any other components of the distributed near-RT RIC. For this reason, FIG. 10 includes a dashed line between the RIC SDKs 1015 of the two control plane applications 1020 to indicate that in some embodiments the RIC SDKs 1015 of these applications communicate directly with each other.

The enablement APIs in some embodiments include registration APIs, service discovery APIs as well as inter-app communication APIs. Registration APIs are used by the applications 1020 (e.g., xApps) to introduce themselves to other applications 1020 by providing their network identifiers (e.g., their network address and available L4 ports) and providing their functionality (e.g., performing channel prediction). Service discovery APIs allow control plane applications 1020 (e.g., xApps) to query the service directory (e.g., of the distributed near-RT RIC) for other control plane applications (e.g., other xApps) that provide a particular service. The inter-app communication APIs allow the control plane applications to communicate with each other to pass along data and/or request certain operations.

Some embodiments deploy an SDL cache on the same host computer as a control plane application and use this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a RIC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

Figure 11:
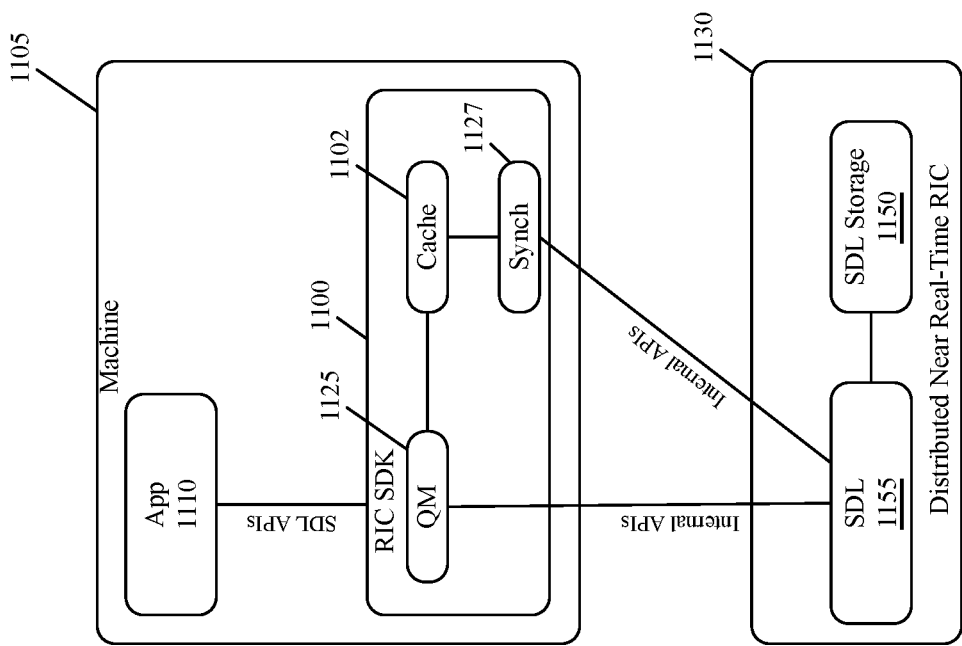
FIG. 11 illustrates embodiments in which the SDL cache is part of each RIC SDK that executes on the same machine as its control plane application.

FIG. 11 illustrates embodiments in which the SDL cache 1102 is part of each RIC SDK 1100 that executes on the same machine 1105 as its control plane application 1110. As shown, the RIC SDK 1100 includes a query manager 112 that processes SDL requests from the CP application 1110 and a synchronizing service 1127 that synchronizes the data stored in the SDL cache 1102 with the data stored in an SDL storage 1150 of the SDL 1155 of the distributed near-RT RIC 1130. In this example, the SDL storage 1150 operates on a different host computer than the host computer on which the control plane application 1110 executes. However, in other embodiments, at least a portion of the SDL storage 1150 operates on the same host computer on which the control plane application 1110 executes.

When the control plane application 1110 uses a high-level API call to read or write data to the SDL storage, the query manager 1125 of the RIC SDK 1100 first determines whether the data record being read or written is stored in the SDL cache 1102. If so, the query manager 1125 reads from or writes to this record. When this operation is a write operation, the synchronizing service 1127 writes the new data in real-time or on batch basis to the SDL storage 1150. On the other hand, when query manager 1125 of the RIC SDK 1100 determines that the data record being read or written is not stored in the SDL cache 1102, it passes the API call to the SDL layer of the distributed near-RT RIC to perform the requested read or write operation. When passing this API call, the RIC SDK 1100 modifies the format of this call and/or modifies the parameters supplied with this call in some embodiments.

Some embodiments provide various methods for offloading operations in an O-RAN (Open Radio Access Network) onto control plane (CP) or edge applications that execute on host computers with hardware accelerators in software defined datacenters (SDDCs). For instance, at the CP or edge application operating on a machine executing on a host computer with a hardware accelerator, the method of some embodiments receives data, from an O-RAN E2 unit, for which it has to perform an operation. The method uses a driver of the machine to communicate directly with the hardware accelerator to direct the hardware accelerator to perform a set of computations associated with the operation.

This driver allows the communication with the hardware accelerator to bypass an intervening set of drivers executing on the host computer between the machine's driver and the hardware accelerator. Through this driver, the application in some embodiments receives the computation results, which it then provides to one or more O-RAN components (e.g., to the E2 unit that provided the data, to another E2 unit, or to another xApp).

FIGS. 12-18 illustrate several different embodiments for offloading O-RAN operations to CP or edge applications that have passthrough access to the hardware accelerators of their host computers. Examples of such a hardware accelerator include a graphical processing unit (GPU), a field-programmable gate array (FPGA), an application-specific integrated circuit (ASIC), and a structured ASIC.

Figure 12:
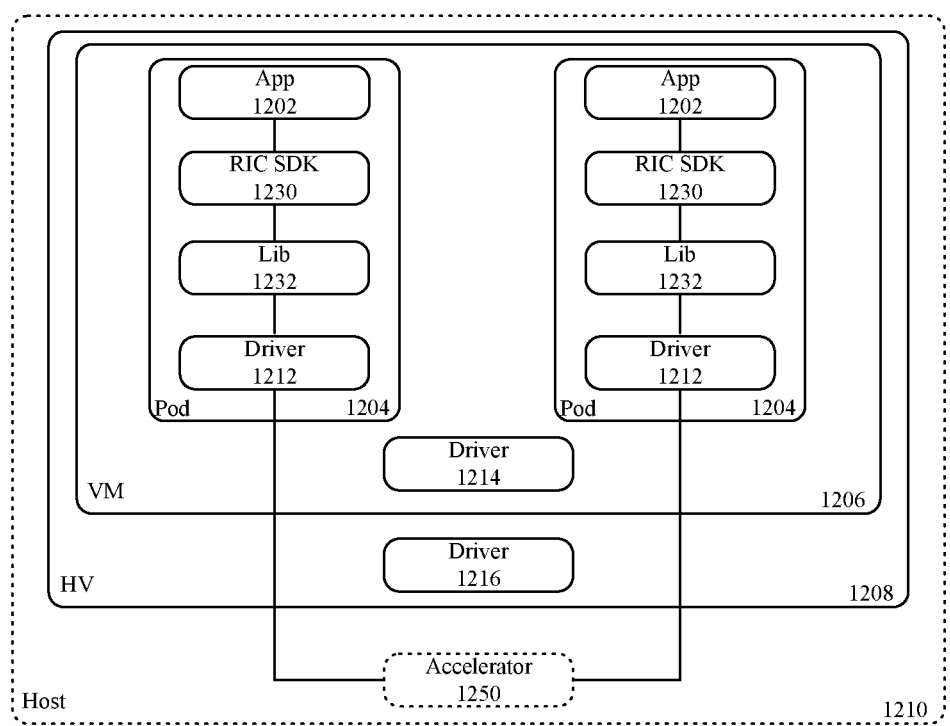
FIG. 12 illustrates an example of control or edge applications that have passthrough access to hardware accelerator of their host computer to perform some or all of their computations.

FIG. 12 illustrates an example of CP or edge applications 1202 that have passthrough access to hardware accelerator 1250 of their host computer 1210 to perform some or all of their computations. As shown, each application 1202 executes on a Pod 1204, which has accelerator drivers 1212 with direct, passthrough access to the accelerator 1250 of their host computer 1210. Each Pod 1204 operates within (i.e., execute on) a VM 1206, which, in turn, executes over a hypervisor 1208 of the host computer.

In some embodiments, a Pod is a small deployable unit of computing that can be created and managed in Kubernetes. A Pod includes a group of one or more containers with shared storage and network resources, and a specification for how to run the containers. In some embodiments, a Pod's contents are always co-located and co-scheduled, and run in a shared context. A Pod models an application-specific logical host computer; it contains one or more application containers that communicate with each other. In some embodiments, the shared context of a Pod is a set of an operating system namespaces (e.g., Linux cgroups). Within a Pod's context, the individual applications may have further sub-isolations applied.

Each Pod's accelerator driver 1212 has direct accesses to the hardware accelerator 1250, and this access bypasses the hardware accelerator drivers 1214 and 1216 of the VM 1206 and the hypervisor 1208. In some embodiments, the hypervisor 1208 executes over an operating system (not shown) of the host computer 1210. In these embodiments, the direct access of each Pod's accelerator driver 1212 to the hardware accelerator 1250 also bypasses the hardware accelerator driver of the operating system.

To communicate with the hardware accelerator, each application 1202 in some embodiments communicates through the RIC SDK 1230 executing on its Pod. For instance, in some embodiments, each application 1202 uses high-level APIs of the RIC SDK 1230 to communicate with the hardware accelerator 1250. The RIC SDK 1230 then converts the high-level APIs to low-level APIs that are needed to communicate with machine's driver 1212, which, in turn, relays the communication to the hardware accelerator 1250. The low-level APIs are provided by a first company associated with the sale of the hardware accelerator 1250, while the RIC SDK 1230 is provided by a second company associated with the distribution of the RIC SDK 1230. In some embodiments, the low-level APIs used by the RIC SDK 1230 are APIs specified in an API library 1232 associated with the hardware accelerator 1250.

Figure 13:
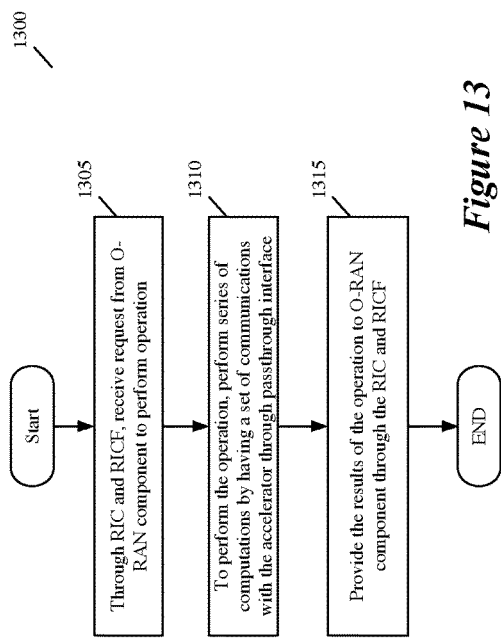
FIG. 13 illustrates a process that is performed in some embodiments in response to an O-RAN component directing a CP or edge application to perform an operation that requires the application to use a hardware accelerator of its host computer.
Figure 14:
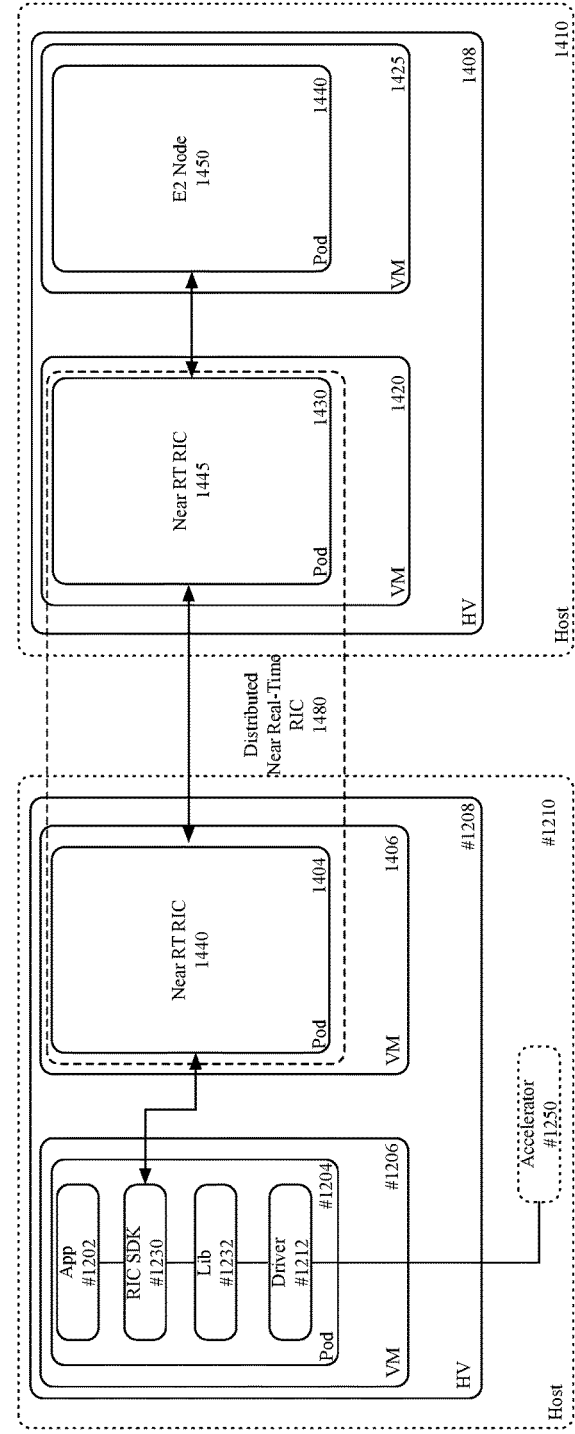
FIG. 14 illustrates an application performing an operation based on data from an E2 node.

FIG. 13 illustrates a process 1300 that implements the method of some embodiments. The process 1300 is performed in response to an O-RAN component directing a CP or edge application to perform an operation that requires the application to use a hardware accelerator of its host computer. This process 1300 will be described below by reference to FIG. 14, which illustrates the application 1202 performing an operation based on data received from an E2 node 1450.

As shown in FIG. 13, the process 1300 starts when the application 1202 (at 1305) receives data from an O-RAN E2 unit 1450 executing on the host computer 1410. In some embodiments, the application 1202 subscribes for data from the E2 unit 1450, and the data received at 1305 is in response to this subscription. This subscription is made through the distributed near-RT RIC 1440 in some embodiments. The host computers 1210 and 1410 of the application 1202 and the E2 unit 1450 operate in one SDDC in some embodiments. In other embodiments, these two host computers 1210 and 1410 operate in two different physical locations. For example, the host computer 1210 operates in a first location, while the host computer 1410 operates at a second location close to a cell site of the O-RAN. In some embodiments, the second location does not have computers with hardware accelerators that perform complex operations including the received operation.

The application 1202 receives (at 1305) the data from the E2 unit 1450 through (1) the distributed near-RT RIC 1480 formed by near-RT RICs 1440 and 1445 executing on host computers 1210 and 1410, and (2) the RIC SDK 1230 executing on its Pod 1204. The application 1202 then uses (at 1310) the hardware accelerator 1250 to perform a set of computations associated with the operation.

To communicate with the hardware accelerator 1250, the application 1202 uses high-level APIs provided by the RIC SDK 1230. The RIC SDK 1230 then converts the high-level APIs to low-level APIs specified in the API library 1232 associated with the hardware accelerator 1250. These low-level APIs are then communicated to the hardware accelerator 1250 by the Pod's driver 1212 through its direct, passthrough access to the accelerator 1250, which bypasses the drivers 1214 and 1216 of the VM 1206 and hypervisor 1208. Through this driver 1212, the APIs specified in the API library 1232, and the RIC SDK 1230, the application 1202 also receives the results of the operations (e.g., computations) performed by the hardware accelerator 1250.

The application 1202 provides (at 1315) the result of its operation to one or more O-RAN components, such as the E2 unit 1450 that provided the data that started the process 1300 or the SDL storage. This result is provided through the RIC SDK 1230 and the distributed near-RT RIC 1480. In other embodiments, the application 1202 (through the RIC SDK 1230) provides the results of its operation to one or more other applications (applications other than the E2 unit that provided the data for which the application performed its operation) operating on another O-RAN E2 unit or machine executing on the same host computer or on another host computer as the application that uses the hardware accelerator 1250 to perform the operation. The process 1300 ends after 1315.

Figure 15:
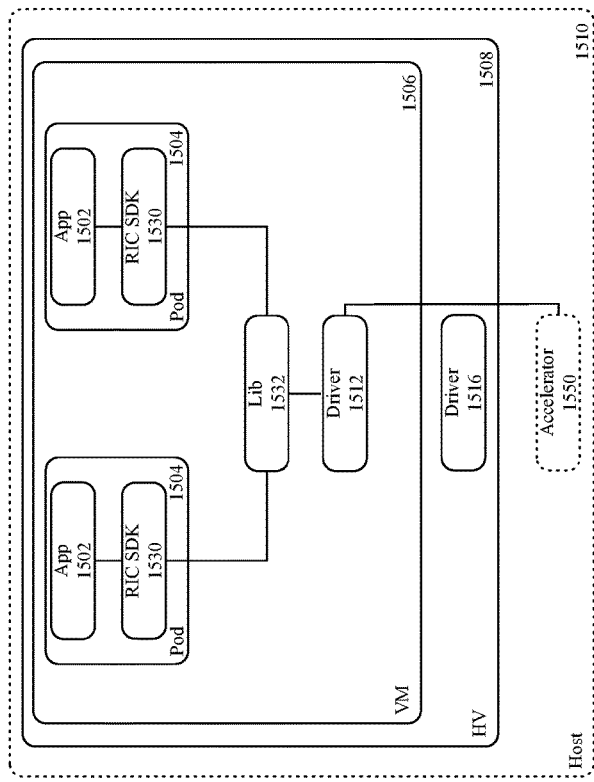
FIG. 15 illustrates another example of a control or edge applications that have passthrough access to a hardware accelerator of their host computer to perform some (or all) of their computations.

Other embodiments use the passthrough access for the O-RAN control or edge application in other deployment settings. For instance, FIG. 15 illustrates another example of CP or edge applications 1502 that have passthrough access to a hardware accelerator 1550 of their host computer 1510 to perform some (or all) of their computations. In this example, each application 1502 (1) executes on a Pod 1504 that executes on a VM 1506, and (2) uses the accelerator driver 1512 of this VM 1506 which has direct, passthrough access to the accelerator 1550 of its host computer 1510. The VM 1506 executes over a hypervisor 1508 operating on the host computer 1510. The VM's accelerator driver 1512 bypasses the hardware accelerator drivers 1516 of the hypervisor 1508. In some embodiments, the hypervisor 1508 executes over an operating system (not shown) of the host computer 1510. In these embodiments, the direct access of the VM's accelerator driver 1512 to the hardware accelerator 1550 bypasses the hardware accelerator driver of the operating system.

To use the hardware accelerator 1550, each application 1502 in some embodiments uses high-level APIs of the RIC SDK 1530 (executing on its Pod 1504) to communicate with the hardware accelerator 1550. The RIC SDK 1530 converts the high-level APIs to low-level APIs that are needed to communicate with VM's driver 1512, which, in turn, relays the communication to the hardware accelerator 1550. In some embodiments, the low-level APIs used by the RIC SDK 1530 are APIs specified in an API library 1532 associated with the hardware accelerator 1550. This API library 1532 is part of the driver interface of the VM 1506.

Figure 16:
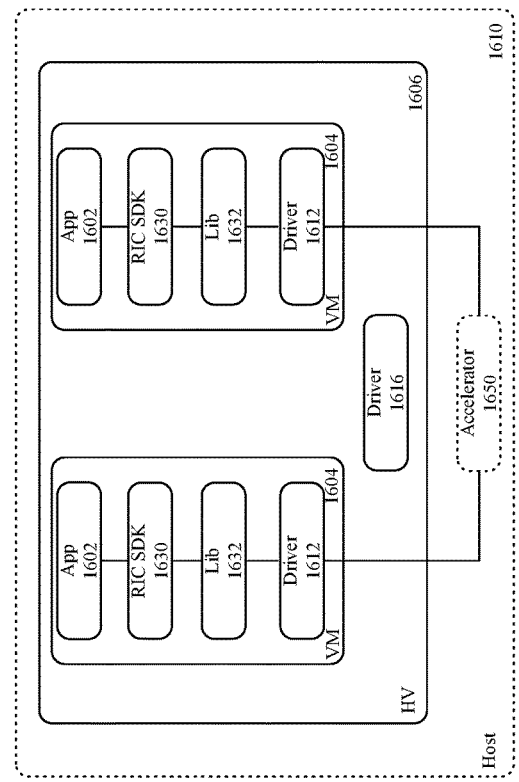
FIG. 16 illustrates yet another example of CP or edge applications that has passthrough access to a hardware accelerator of their host computer to perform some or all of their computations.

FIG. 16 illustrates yet another example of CP or edge applications 1602 that has passthrough access to a hardware accelerator 1650 of their host computer 1610 to perform some or all of their computations. In this example, each application 1602 (1) executes on a VM 1604 that executes on a hypervisor 1606 operating on the host computer 1610, and (2) uses the accelerator driver 1612 of its VM 1604, which has direct, passthrough access to the accelerator 1650 of its host computer 1610.

The VM's accelerator driver 1612 bypasses the hardware accelerator drivers 1616 of the hypervisor 1606. In some embodiments, the hypervisor 1606 executes over an operating system (not shown) of the host computer 1610. In these embodiments, the direct access of the VM's accelerator driver 1612 to the hardware accelerator 1650 bypasses the hardware accelerator driver of the operating system.

To use the hardware accelerator 1650, each application 1602 in some embodiments uses high-level APIs of the RIC SDK 1630 (executing on its VM 1604) to communicate with the hardware accelerator 1650. The RIC SDK 1630 converts the high-level APIs to low-level APIs that are needed to communicate with the VM's driver 1612, which, in turn, relays the communication to the hardware accelerator 1650. In some embodiments, the low-level APIs used by the RIC SDK 1630 are APIs specified in an API library 1632 associated with the hardware accelerator 1650. This API library 1632 is part of the driver interface of the VM 1606.

One of ordinary skill will realize that the passthrough access for the O-RAN control or edge application is used in other deployment settings in other embodiments. For instance, instead of operating on Pods, the applications in other embodiments operate on containers. These embodiments then use the hardware accelerator drivers of their Pods or VMs to have passthrough access to the hardware accelerators for the control or edge application. In some of these embodiments, the control or edge application communicates with the hardware accelerator through its associated RIC SDK and communicates with other O-RAN components (to receive data and to provide results of its processing of the data) through its associated RIC SDK and the distributed near-RT RIC connecting the O-RAN components and the application. In some embodiments, the control or edge application in these embodiments performs processes similar to process 1300 of FIG. 13.

The above-described direct, passthrough access to hardware accelerators is quite beneficial for O-RANs. The RIC is all about decoupling the intelligence that used to be embedded within the RAN software (CU and DU) and moving it to the cloud. One benefit of this is to use more advanced computing in the cloud for the xApp and edge operations (e.g., for ML, deep learning, reinforcement learning for control algorithms, etc.). A DU close to a cell site typically cannot run advance computations because it would not be economically feasible to put GPUs at each cell site as network capital expenditure will be very high.

By using the hardware accelerator (e.g., GPUs, FPGAs, eASICs, ASICs) in the SDDC, some embodiments run complex control algorithms in the cloud. Examples of such xApps include Massive MIMO beam forming and Multi-user (MU) MIMO user pairing, which were described above. Generally, any xApp whose computations can benefit from massive parallelization would gain the benefit of GPUs or other accelerators. The use of ASICs is beneficial for channel decoding/encoding (turbo encoding, LDPC encoding, etc.). In some embodiments, the RIC is typically on the same worker VM as xApps. However, in other embodiments, the RICs executes on a different host computer so that more xApps that need GPUs and other hardware accelerators can run on the hosts with the GPUs and/or other hardware accelerators.

Figure 17:
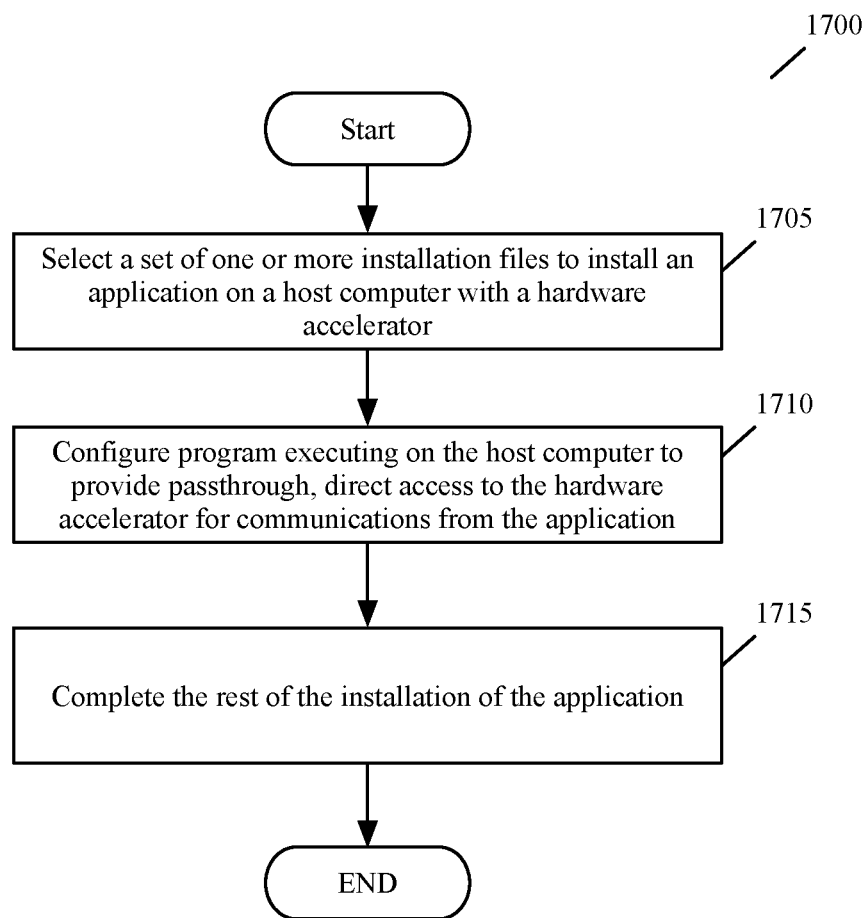
FIG. 17 illustrates a process that some embodiments use to deploy O-RAN applications with direct, passthrough access to the hardware accelerators of their host computers.

FIG. 17 illustrates a process that some embodiments use to deploy O-RAN applications with direct, passthrough access to the hardware accelerators of their host computers. To install an application on a host computer, the process 1700 selects (at 1705) a set of one or more installation files that includes a description for configuring passthrough access for the application to a hardware accelerator of the host computer. In some embodiments, the set of files includes one description file that specifies direct, passthrough access for the application to the hardware accelerator of its computer.

The process 1700 uses (at 1710) the set of installation files to configure, based on the description relating to the passthrough access, a program executing on the host computer to pass calls from a particular hardware accelerator driver associated with the application to the hardware accelerator without going through an intervening set of one or more drivers for the hardware accelerator that executes on the host computer between the particular hardware accelerator driver and the hardware accelerator. This configuration allows the application to bypass the intervening set of drivers when directing the hardware accelerator to perform operations for the application and to receive the results of the operations from the hardware accelerator.

The program that is configured at 1710 in some embodiments is the host's operating system, while in other embodiments it is a hypervisor executing on the host computer. In still other embodiments, the program is a virtual machine (VM) and the application operates on a Pod or container that executes on the VM. The process 1700 completes (at 1715) the installation of the application by processing the remaining set of installation files selected at 1705, and then ends. In other embodiments, the process 1700 performs the configuration of the program as its last operation instead of as its first operation at 1710. In still other embodiments, it performs this configuration as one of its intervening installation operations.

Before performing the selection and configuration, the deployment process of some embodiments identifies the host computer from several host computers as the computer on which the application should be installed. The process in some embodiments identifies the host computer by determining that the application requires a hardware accelerator, identifying a set of host computers that each comprise a hardware accelerator, and selecting the host computer from the set of host computers. The process selects the host computer by (1) determining that the application will need to communicate with a set of one or more other applications that execute on the selected host computer, and (2) selecting the host computer as the set of other applications simultaneously executes on the host computer. This installation of the application with the set of other applications on the selected host computer reduces communication delay between the application and the set of other applications.

Some embodiments have the hardware accelerator drivers of the O-RAN control or edge applications communicate with virtualized hardware accelerators that are offered by an intervening virtualization application (e.g., hypervisor) that executes on the same host computer as the application. For instance, the method of some embodiments deploys a virtualization application on a host computer for sharing resources of the host computer among several machines executing on the host computer. This computer has a first set of one or more physical hardware accelerators.

The method deploys several applications on several machines to perform several O-RAN related operations for a set of O-RAN components. Through the virtualization application, the method defines a second set of two or more virtual hardware accelerators that are mapped to the first set of physical hardware accelerators by the virtualization application. The method assigns different virtual hardware accelerators to different applications. The method also configures the applications to use their assigned virtual hardware accelerators to perform their operations.

In some embodiments, the deployed machines are Pods, and the applications are deployed to execute on the Pods. At least two Pods execute on one VM that executes above the virtualization application. This VM includes a hardware accelerator driver that is configured to communicate with two different virtual hardware accelerators for the two applications executing on the two Pods. In other embodiments, multiple Pods execute on one VM that executes above the virtualization application, and each Pod has a hardware accelerator driver that is configured to communicate with a virtual hardware accelerator that is assigned to that driver.

Figure 18:
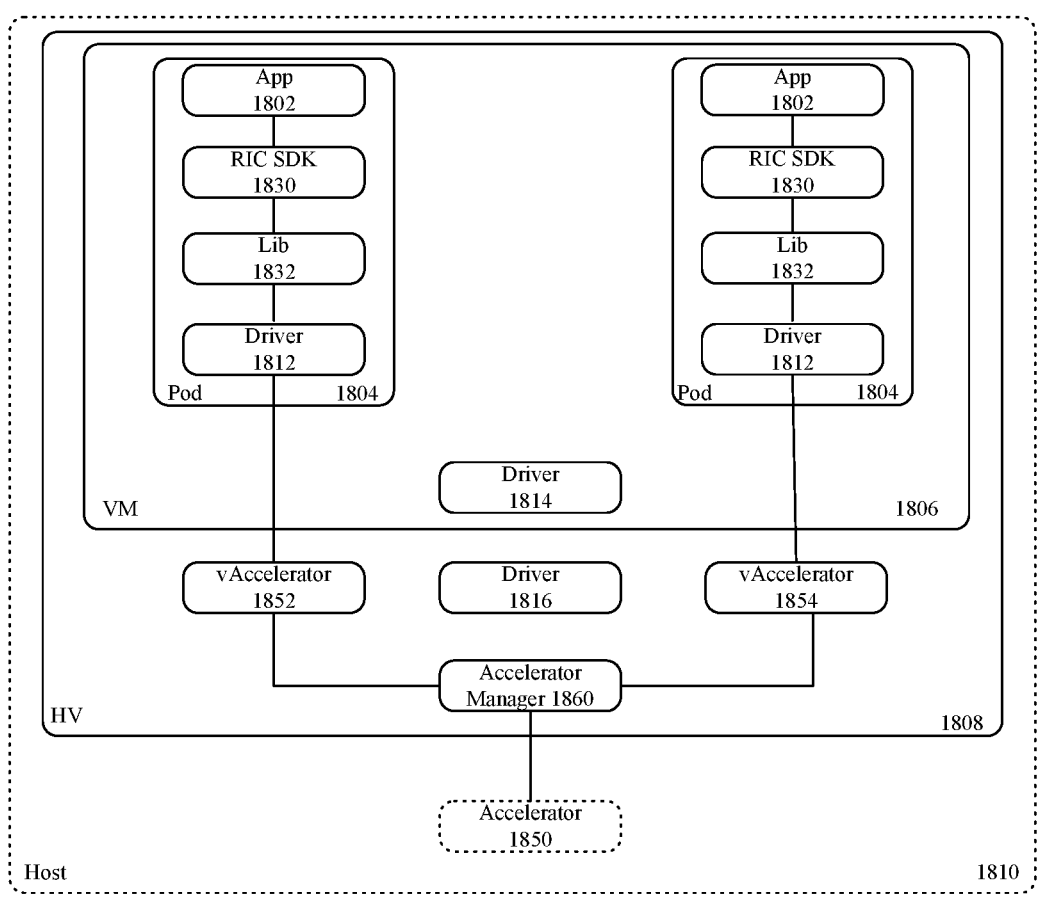
FIG. 18 illustrates an example of CP or edge applications that have passthrough access to virtual hardware accelerator defined by a hypervisor executing on their host computer.

FIG. 18 illustrates an example of CP or edge applications 1802 that have passthrough access to virtual hardware accelerator 1852 and 1854 defined by a hypervisor 1808 executing on their host computer 1810 in order to perform some or all of their computations. As shown, each application 1802 executes on a Pod 1804, which has accelerator drivers 1812 with direct, passthrough access to virtual accelerators 1852 or 1854. Each Pod 1804 operates within (i.e., execute on) a VM 1806, which, in turn, executes over a hypervisor 1808 of the host computer 1810.

Each Pod's accelerator driver 1812 has direct access to the virtual accelerator 1852 or 1854, and this access bypasses the accelerator drivers 1814 and 1816 of the VM 1806 and the hypervisor 1808. In some embodiments, the hypervisor 1808 executes over an operating system (not shown) of the host computer 1810. In these embodiments, the direct access of each Pod's accelerator driver 1812 to the virtual accelerator 1852 or 1854 also bypasses the hardware accelerator driver of the operating system.

As shown, the virtual accelerators 1852 and 1854 communicate to the hardware accelerator 1850 through the accelerator manager 1860 of the hypervisor 1808. The accelerator manager 1860 allows the virtual accelerators 1852 and 1854 (and in turn their associated applications 1802) to share one hardware accelerator 1850, while operating with this accelerator 1850 as if it is dedicated to their respective applications and Pods 1802 and 1804. Examples of such a hardware accelerator 1850 include a graphical processing unit (GPU), a field-programmable gate array (FPGA), an application-specific integrated circuit (ASIC), and a structured ASIC.

To communicate with its virtual accelerator 1852 or 1854, each application 1802 in some embodiments communicates through the RIC SDK 1830 executing on its Pod 1804. For instance, in some embodiments, each application 1802 uses high-level APIs of the RIC SDK 1830 to communicate with its virtual accelerator 1852 or 1854. The RIC SDK 1830 then converts the high-level APIs to low-level APIs that are needed to communicate with each machine's driver 1812, which, in turn, relays the communication to the virtual accelerator 1852 or 1854. The virtual accelerator 1852 or 1854 then relays the communications to the hardware accelerator 1850 through the accelerator manager 1860.

As mentioned above by reference to FIG. 12, in some embodiments, the low-level APIs are provided by a first company associated with the sale of the hardware accelerator 1850, while the RIC SDK 1830 is provided by a second company associated with the distribution of the RIC SDK 1830. In some embodiments, the low-level APIs used by the RIC SDK 1830 are APIs specified in an API library 1832 associated with the hardware accelerator 1850. Each application 1802 receives the results of the operations of the hardware accelerator 1850 through the accelerator manager 1860, its virtual accelerator 1852 or 1854, its driver 1812, and its RIC SDK 1830.

Having described the distributed near real-time RIC and the RIC SDK of some embodiments, the following describes the MAC scheduler and user-level tracing applications of some embodiments. In some embodiments, one or more applications (e.g., xApps) are deployed to perform MAC scheduling and/or user-level tracing. Examples of MAC scheduling operations that can be performed by applications running on top of the distributed near real-time RIC in some embodiments include beamforming weight calculation, RF condition prediction, and MU-MIMO pairing suggestion. Examples of user-level tracing functions that can be performed by applications running on top of the distributed near real-time RIC in some embodiments include operations to (1) track user behavior in a cell, (2) track user RF condition, (3) track user data traffic performance in different layers (MAC, RLC, PDCP), and (4) track user RF resource consumption. In some embodiments, outputs of the user-level tracing applications may be used by one or more of the MAC scheduler applications.

Figure 19:
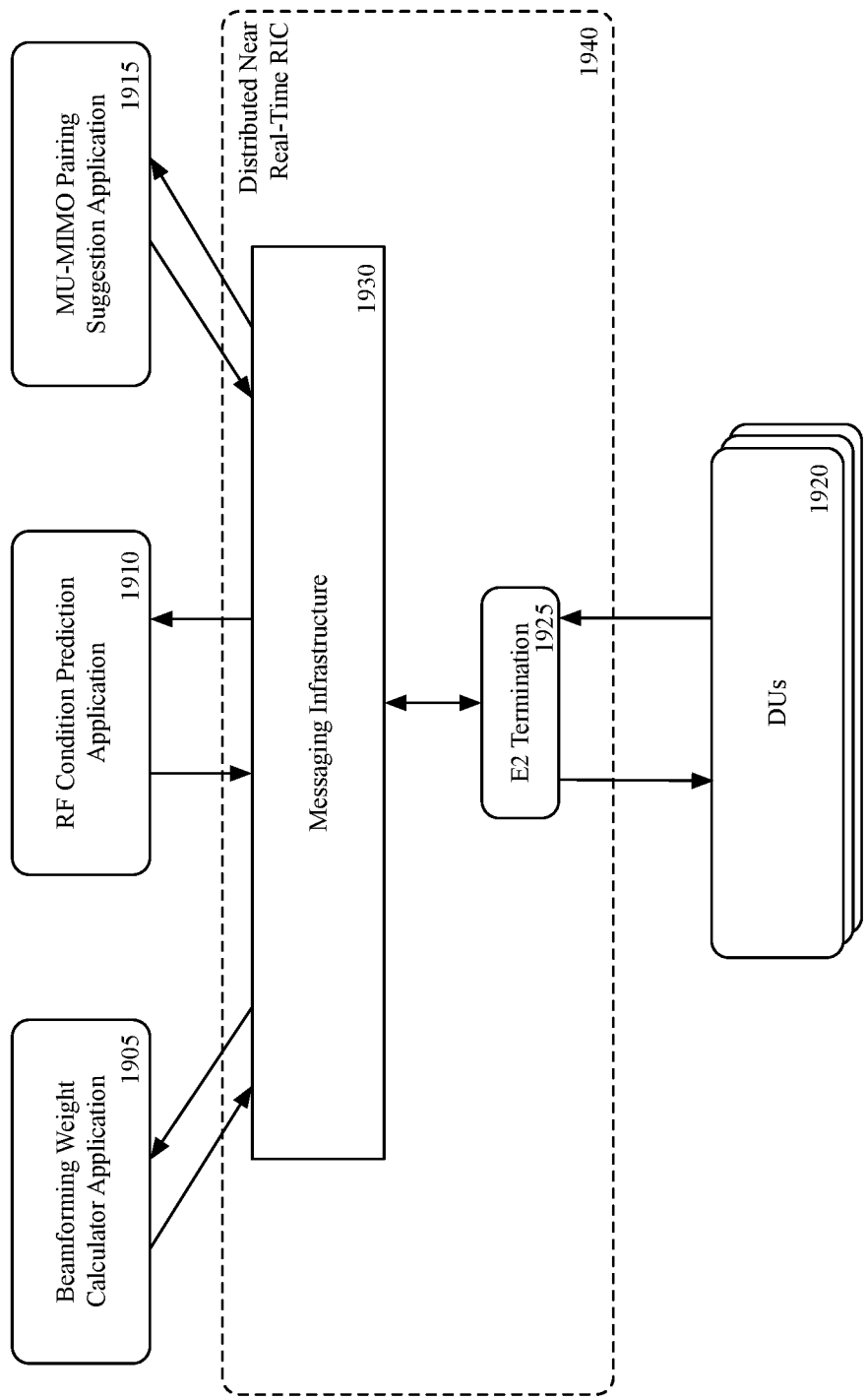
FIG. 19 illustrates data flow for a set of MAC scheduler applications that operate on top of the distributed near real-time RIC.

FIG. 19 illustrates data flow for a set of MAC scheduler applications 1905-1915 that operate on top of the distributed near real-time RIC 1940. These applications may operate in any of the manners described above by reference to FIGS. 3-18 in some embodiments. The MAC scheduler application includes a beamforming weight calculator application 1905, an RF condition prediction application 1910, and an MU-MIMO pairing suggestion application 1915.

As shown, each of these applications 1905-1915 receives data through the distributed near real-time RIC 1940 from one or more DUs 1920 (which, as noted above, are examples of E2 nodes) and provides output data to the DUs 1920. In different embodiments, the MAC scheduler applications 1905-1915 may provide their output data to the same DU(s) from which corresponding input data was received or different DU(s) from which the corresponding input data was received.

In order for one of the applications 1905-1915 (or other applications) to receive data from the DUs 1920 or other E2 nodes, in some embodiments an application subscribes to a specific type of data with an E2 node, via the distributed near real-time RIC 1940. The application sends a subscription request to the RIC (e.g., via the set of connectivity APIs of the RIC SDK), which records the request. Though not shown in FIG. 19, the subscription management services 352 shown in FIG. 3 handle these subscription requests and store the subscription information (e.g., which data from which E2 nodes needs to be forwarded to which applications). The RIC generates a subscription to send to the set of one or more E2 nodes specified by the requesting application (in the correct E2 format) and sends this data to the correct nodes via the E2 interface. The applications can request data from one or more E2 nodes (e.g., DUs and CUs at the same base station, multiple DUs and/or multiple CUs at different base stations, etc.). If the E2 nodes send subscription acknowledgements back to the RIC (i.e., indicating that they will provide the requested data as it becomes available), the RIC uses the stored subscription information to provide confirmation to the correct requesting application(s).

Figure 20:
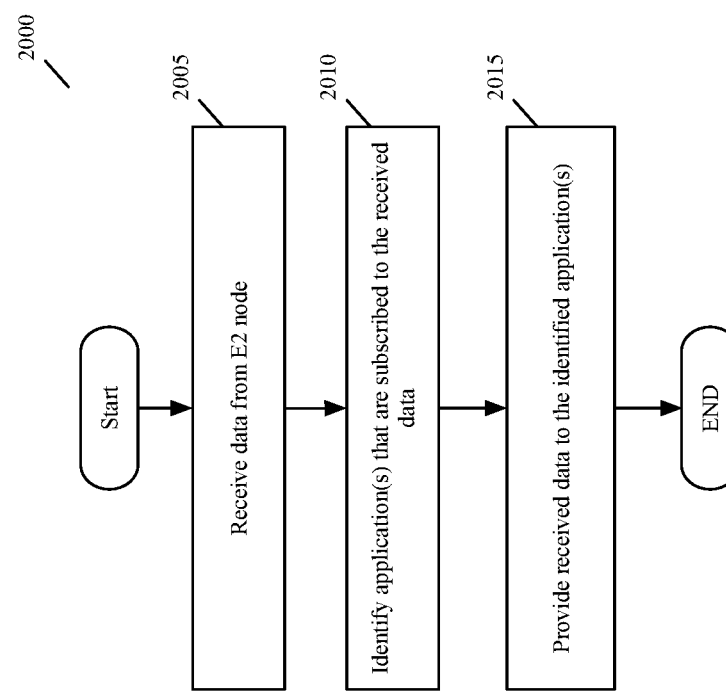
FIG. 20 conceptually illustrates a process of some embodiments for the distributed near real-time RIC to provide subscription data from an E2 node to applications.

FIG. 20 conceptually illustrates a process 2000 of some embodiments for the distributed near real-time RIC to provide subscription data from an E2 node to applications (e.g., one or more of the MAC scheduler applications 1905-1915). This process 2000 will be described in part by reference to FIG. 19.

As shown, the process 2000 begins by receiving (at 2005) data from an E2 node. The distributed near real-time RIC 1940 receives this data at the E2 termination interface 1925 in some embodiments. This can be any sort of data that the E2 node provides to the distributed near real-time RIC, examples of which are described below for the MAC scheduler applications 1905-1915. In some embodiments, the E2 nodes are specified to expose different types of data via report interfaces with the distributed near real-time RIC.

The process 2000 then identifies (at 2010) one or more applications that are subscribed to the received data based on stored subscription forwarding information. The subscription forwarding information is stored when an application requests a subscription to a particular type of data from a particular set of E2 nodes and that subscription request is acknowledged by the E2 node(s). In different embodiments, the E2 termination interface 1925, the subscription management service (not shown in this figure), or the messaging infrastructure 1930 stores this subscription forwarding information so as to route data between the E2 nodes (e.g., the DUs 1920) and the applications (e.g., the MAC scheduler applications 1905-1915). Next, the process 2000 provides the data (at 2015) to the one or more identified applications. In some embodiments, this data is provided via the messaging infrastructure 1930 (e.g., various aspects of the RIC SDK as described above). The process 2000 then ends.

Figure 21:
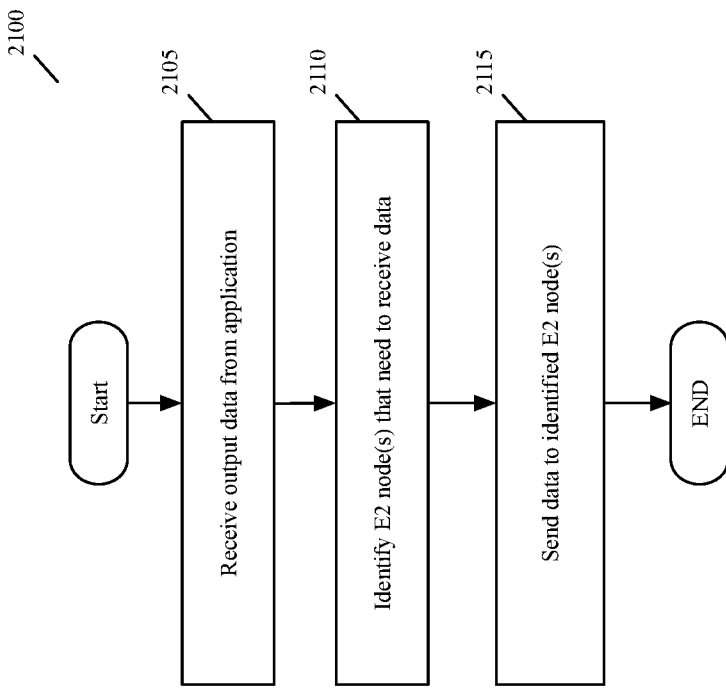
FIG. 21 conceptually illustrates a process of some embodiments for the distributed near real-time RIC to provide data output by an application to one or more E2 nodes.

The MAC scheduler applications 1905-1915 use different types of input data from the E2 nodes to produce different types of output data, which are in turn provided back to one or more E2 nodes (e.g., to the DUs that provided the input data). FIG. 21 conceptually illustrates a process 2100 of some embodiments for the distributed near real-time RIC to provide data output by an application (e.g., one of the MAC scheduler applications 1905-1915) to one or more E2 nodes (e.g., one or more of the DUs 1920). The process 2100 will be described in part by reference to FIG. 19.

As shown, the process 2100 begins by receiving (at 2105) output data from an application. The application may be one of the MAC scheduler applications 1905-1915, a user-level tracing application, or another application that provides data back to one or more E2 nodes. Examples of data that the MAC scheduler applications 1905-1915 provide to the E2 nodes will be described below. In some embodiments, the data is provided via the messaging infrastructure 1930 (e.g., various aspects of the RIC SDK described above) in such a way that specifies that the data is to be sent to E2 nodes (e.g., as opposed to being sent to another application or stored in the SDL storage).

The process then identifies (at 2110) one or more E2 nodes that need to receive the data. In some embodiments, the data from the application indicates a type of data that the distributed near real-time RIC uses to identify its destination. In other embodiments, the subscription forwarding information stored by the distributed near real-time RIC indicates which applications output data to which E2 nodes, and uses this to identify the recipient E2 nodes based on the specific application that provided the output data. As noted above, this information may be stored in different embodiments by the E2 termination interface 1925, the subscription management service (not shown in FIG. 19), or the messaging infrastructure 1930. Next, the process 2100 sends (at 2115) the data to the one or more identified E2 nodes (e.g., via the E2 termination interface 1925). The process 2100 then ends.

As noted, different MAC scheduler applications receive different types of data and generate different types of output data. Each of these applications receives specific types of data from the DU (via the E2 interface and the RIC framework) and provides its output data to the DU. These applications may also receive other information (e.g., to perform more complex operations than would be available at the DU) from other sources (e.g., other applications, such as the user-level tracing applications).

The beamforming weight calculator application 1905 of some embodiments computes a beamforming weight matrix or a beam index/beam identifier for a UE (e.g., a mobile device). This weight matrix or beam index specifies how a base station should transmit signals to the UE. The DU 1920 uses the matrix to control the MIMO antenna array gain/phasing in the RU for user data transmission and reception in some embodiments. The DU 1920, in some embodiments, can use any of several different beamforming methods, including predefined-beam beamforming, weight-based dynamic beamforming based on real-time-updated weights (for which the beamforming weight calculator application 1905 calculates the weights), attribute-based dynamic beamforming based on real-time-updated beam attributes (for which the beamforming weight calculator application 1905 or other applications could compute attributes), and channel-information-based beamforming.

From the DU 1920 (via the RIC), the beamforming weight calculator application 1905 receives information related to an uplink Sounding Reference Signal (UL SRS), such as an UL channel response matrix and/or phase (I) and quadrature (Q) data exposed by the DU 1920 via a report interface. In some embodiments, the input to the beamforming weight calculator application 1905 can include multiple options based on the UL SRS, such as raw SRS received data and an SRS channel responses matrix from a channel estimate. In some embodiments, the DU also indicates its supported beamforming method (e.g., weight-based) as well as method-dependent information such as the beamforming type (e.g., frequency, time, or hybrid) as well as the number of beams.

The beamforming weight calculator application 1905 calculates and provides to the DU 1920 (e.g., the same DU from which the UL SRS channel response matrix was received), through the RIC, the beamforming matrix for the UE via an exposed control interface of the DU 1920. In some embodiments, the information provided to the DU includes a set of UE identifiers and a beamforming weight matrix (e.g., for each UE) that specifies a I/Q data per antenna element for the UE, or a beam identifier that should be used for a certain UE.

The beamforming weight calculator algorithm, in some embodiments, evaluates the optimal beam-forming weights to reach the user. Some embodiments use traditional signal processing algorithms that are based on channel models. Alternatively, or conjunctively, machine-learning based algorithms that utilize raw data inputs may be used, which in some cases require feedback from the DU 1920. In some embodiments, the output beamforming weight matrix could also be mapped to a beam index from a pre-designed beam set. Machine-learning based beamforming calculations could, for example, look at where users are located or determine the population density of UEs in an area and design beams differently based on this information. For instance, for locations that are denser, the beamforming weight calculator application 1905 might provide a weight matrix with more precise beams, whereas less precision is required for less dense areas. Similarly, the beamforming weight calculator application 1905 could take into account the type of traffic being carried and design a beamforming weight matrix with a better guarantee of reliability for more important traffic. The data required for these computations could come from a combination of the DU, other E2 nodes at the same base station, other applications, etc.

The RF condition prediction application 1910 of some embodiments computes the RF condition of a UE; that is, a predicted downlink (DL) and/or uplink (DL) channel condition (e.g., including DL signal to noise interference and noise ratio (SINR), precoder matrix indicators (PMI), and rank) for an upcoming (e.g., next or near-future) scheduling window. From the DU 1920 (via the RIC), the RF condition prediction application 1910 receives at least a DL and/or UL channel condition report exposed by the DU 1920 via a report interface. The channel condition report may include Wideband or Subband channel quality information (CQI), PMI (used to signal preferred weights), and rank indicators (RI, used to indicate a number of layers required during layer mapping). In some embodiments, the input metrics for the RF condition prediction application 1910 could also include supportive information such as UE distance, UE positioning, etc. (e.g., received from the DU or from other sources).

The RF condition prediction application 1910 calculates and provides to the DU 1920 (e.g., the same DU from which the channel condition report was received), through the RIC, the predicted UL and/or DL channel condition. The output metrics can include, in some embodiments, the predicted channel condition of the user for the upcoming (e.g., next or near-future) scheduling window, as well as predicted downlink and uplink SINR, a precoding matrix (e.g., if applicable), and SU-MIMO layers. In some embodiments, these output metrics are used by the DU for the user link adaptation on physical downlink control channel (PDCCH), physical downlink shared channel (PDSCH), and physical uplink shared channel (PUSCH) transmissions. Some embodiments utilize traditional signal processing algorithms based on channel and mobility models. Alternatively, or conjunctively, some embodiments also use machine learning based algorithms using data inputs and potentially other factors, such as site layout.

The MU-MIMO pairing suggestion application 1915 of some embodiments determines UE pairing suggestions and computes SINR impact assessments for such pairings. This pairing suggestion indicates which UEs should be paired for MU-MIMO operations. From the DU 1920 (via the RIC), the MU-MIMO pairing suggestion application 1915 receives UE-specific beamforming weight matrices or other UE-specific beamforming data (e.g., a beam index) exposed by the DU 1920 via a report interface (e.g., the same beamforming weight matrices computed by the beamforming weight calculator application 1905). In some embodiments, additional information such as the UE RF condition estimate (e.g., as computed by the RF condition prediction application 1910), user data demand, and other supportive metrics may be used by the MU-MIMO pairing suggestion application 1915.

The MU-MIMO pairing suggestion application 1915 calculates and provides to the DU 1920 (e.g., the same DU from which the UL SRS channel response matrix was received), through the RIC, UE pairing suggestion and SINR impact assessment via an exposed control interface of the DU 1920. In some embodiments, each pairing suggestion includes a set of UE identifiers identifying the UEs that should be paired. Optionally, the pairing suggestions of some embodiments include beamforming weights or a beam identifier for each UE in the pairing as well as a DL transmit power allocation for each UE in the pairing. Some embodiments also include an SINR reduction for each UE identifier if the set of UEs is co-scheduled with the indicated beamforming weights and transmit power allocation.

The DU 1920 can use this information to select users for RF scheduling and to determine transmission efficiencies. Some embodiments use traditional signal processing algorithms based on information theory and cross-channel covariance evaluation. Alternatively, or conjunctively, some embodiments use machine learning based algorithms using the data inputs, which in some cases requires feedback from the DU 1920. This machine learning can factor in additional information; for example, in some cases the MU-MIMO pairing suggestion application 1915 might avoid pairing users that have different performance targets (e.g., different levels of importance to the data being sent to these UEs).

Figure 22:
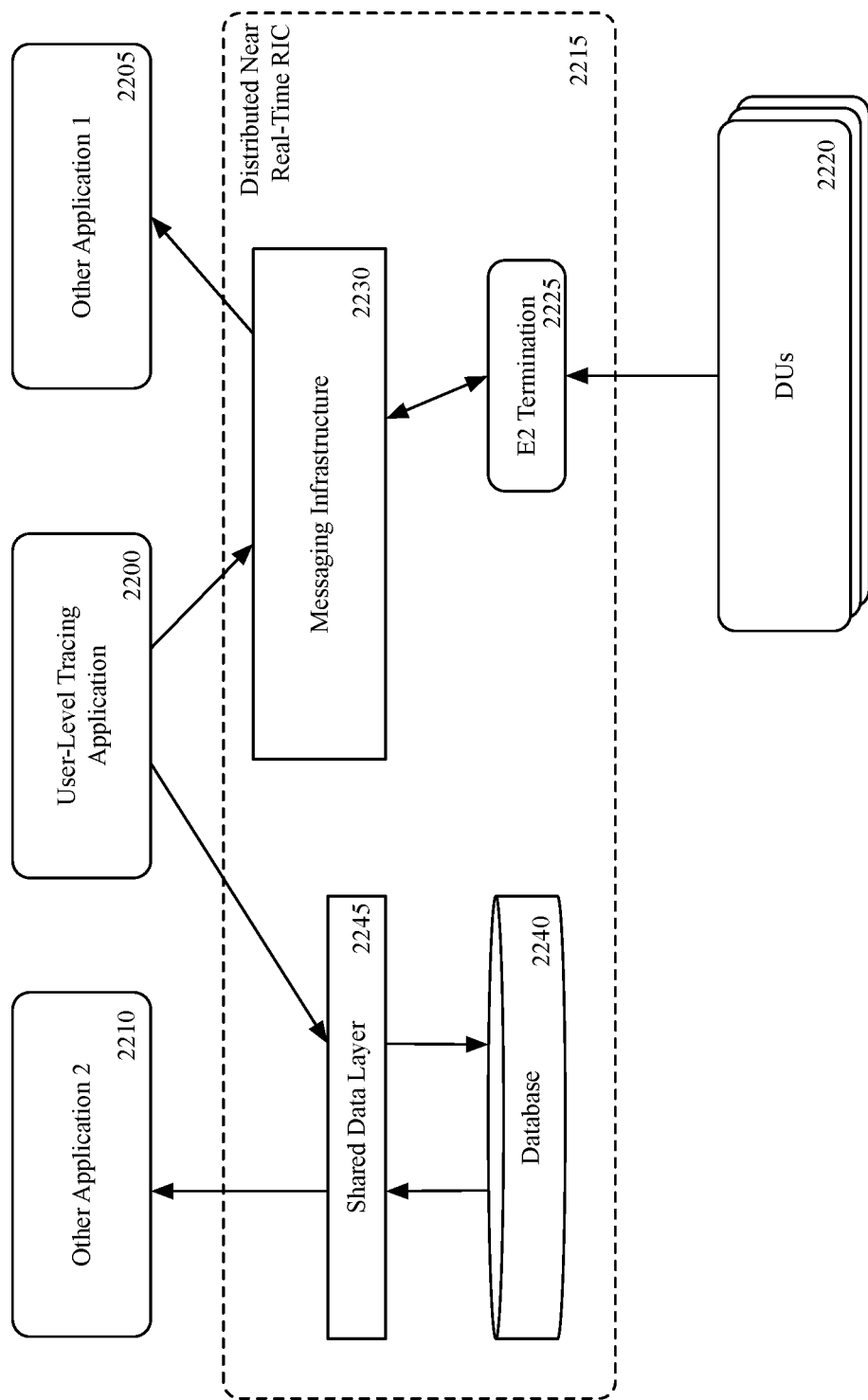
FIG. 22 illustrates data flow for a user-level tracing application as well as other applications that operate on top of the distributed near real-time RIC.

FIG. 22 illustrates data flow for a user-level tracing application 2200 as well as other applications 2205 and 2210 that operate on top of the distributed near real-time RIC 2215. These applications may operate in any of the manners described above by reference to FIGS. 3-18 in some embodiments. It should also be noted that while only a single user-level tracing application 2200 is shown, some embodiments can include numerous such applications that perform different tracing operations. These tracing operations can include operations to (i) track user behavior in a cell, (ii) track user RF condition, (iii) track user data traffic performance in different layers (MAC, Radio Link Control (RLC), Packet Data Convergence Protocol (PDCP)), and/or (iv) track user RF resource consumption, as well as other tracking/tracing functions.

The user-level tracing application 2200 of some embodiments receives data through the distributed near real-time RIC 2215 from one or more DUs 2220 (which, as noted above, are examples of E2 nodes) and provides output data to the other applications 2205 and 2210 (which could include, e.g., any of the MAC scheduler applications 1905-1915). As an example, another application might perform analysis on the user data performance received from the user-level tracing applications 2200, determine that certain performance is inadequate, and modify how the RAN is treating the user traffic. In different embodiments, the user-level tracing application 2200 provides some or all of its output data to one or more DUs 2220.

As with the MAC scheduler applications 1905-1915, the user-level tracing application 2200 subscribes to specific types of data with the DUs 2220 (or with other E2 nodes) via the distributed near real-time RIC 2215. The application 2200 sends a subscription request to the RIC (e.g., via the set of connectivity APIs of the RIC SDK), which records the request. Though not shown in FIG. 22, the subscription management services 352 shown in FIG. 3 handle these subscription requests and store the subscription information (e.g., which data from which E2 nodes needs to be forwarded to which applications). The RIC generates a subscription to send to the set of one or more E2 nodes specified by the requesting application (in the correct E2 format) and sends this data to the correct nodes via the E2 termination interface 2225. The application 2200 can request data from one or more E2 nodes (e.g., DUs and CUs at the same base station, multiple DUs and/or multiple CUs at different base stations, etc.). If the E2 nodes send subscription acknowledgements back to the RIC (i.e., indicating that they will provide the requested data as it becomes available), the RIC uses the stored subscription information to provide confirmation to the correct requesting application(s).

Data can then be received by the user-level tracing application 2200 in a manner similar to that described above by reference to FIG. 20. In some embodiments, the DU exposes report interfaces to provide various metrics to the user level tracing application 2200. These metrics can include selected Radio Resource Control (RRC) messages, traffic volume and performance for any of MAC, radio link control (RLC), and/or packet data convergence protocol (PDCP), RF condition information, RF resources consumption, and/or other metrics. In some embodiments, messages over these interfaces to the RIC are triggered based on user behavior and/or periodic reporting.

As noted, the output data from the user-level tracing application 2200 is provided to other applications (e.g., applications 2205 and 2210) in some embodiments. The output data, as noted, may include tracking data for (i) user behavior in a cell, (ii) user RF condition, (iii) user data traffic performance in different layers (MAC, RLC, PDCP), and/or (iv) user RF resource consumption. This information could be used by machine learning algorithms in the MAC scheduler applications (e.g., to perform more accurate beamforming weight matrix computations).

The data can either be provided from the user-level tracing applications to these other applications as the data is generated or stored in a data storage of the RIC for later retrieval by the other applications. In the example shown in FIG. 22, the user-level tracing application 2200 provides data directly to the first other application 2205 via the messaging infrastructure 2230 of the distributed near real-time RIC. Examples of this messaging infrastructure in different embodiments are described above (e.g., by reference to FIGS. 6-9). This allows the data to be provided quickly to the other application 2205.

If the other application that uses the user-level tracing data does not require data as quickly as possible, in some embodiments the user-level tracing application 2200 stores the data to a location in the data storage 2240 via the shared data layer (SDL) 2245. The operation of the SDL according to some embodiments is described above (e.g., by reference to FIG. 11). When the application 2210 requires the data from the user-level tracing application 2200, this application 2210 can retrieve the data from the data storage 2240 via the SDL 2245.

One example of a user-level tracing application of some embodiments includes QoS scheduling optimization with the goal of adjusting a user's scheduling priority for an RF resource to optimize the service quality. The input for some embodiments of this application includes a service quality target from a user subscription. In some embodiments, the algorithm used by the application is based on the QoS target and observed user traffic performance and can be used to determine that a user's resource allocation is insufficient. The algorithm format, in some embodiments, can be logic-based or machine learning-based. In some embodiments, the output includes a recommendation issued to a MAC scheduler application to adjust the traffic priority or link adaptation in order to improve performance.

Figure 23:
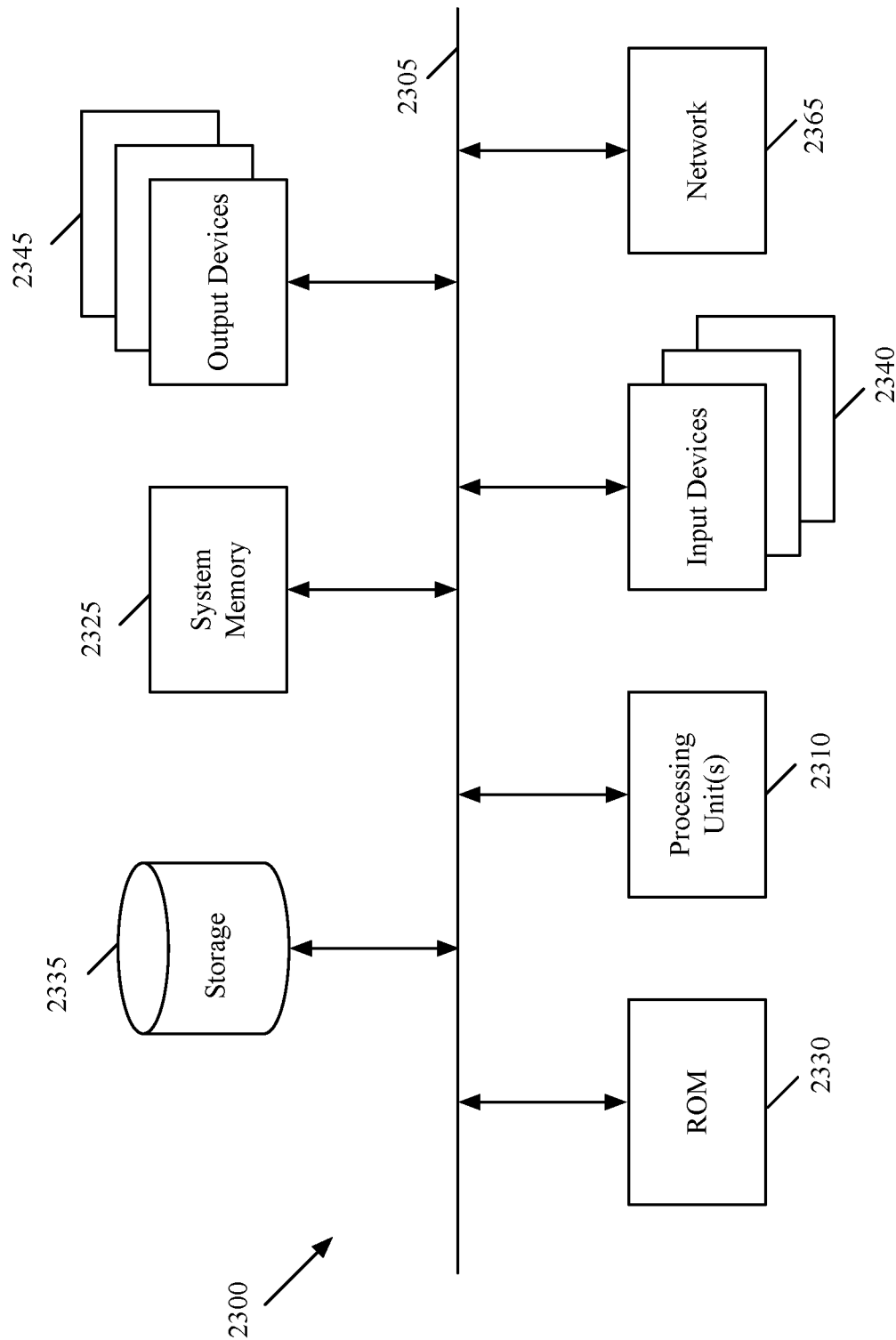
FIG. 23 conceptually illustrates an electronic system with which some embodiments of the invention are implemented.

FIG. 23 conceptually illustrates an electronic system 2300 with which some embodiments of the invention are implemented. The electronic system 2300 may be a computer (e.g., a desktop computer, personal computer, tablet computer, server computer, mainframe, a blade computer etc.), or any other sort of electronic device. Such an electronic system 2300 includes various types of computer-readable media and interfaces for various other types of computer-readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various memory units, the processing unit(s) 2310 retrieve instructions to execute and data to process in order to execute the processes of the invention. The processing unit(s) 2310 may be a single processor or a multi-core processor in different embodiments.

The read-only-memory (ROM) 2330 stores static data and instructions that are needed by the processing unit(s) 2310 and other modules of the electronic system 2300. The permanent storage device 2335, on the other hand, is a read-and-write memory device. This device 2335 is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device 2335. Like the permanent storage device 2335, the system memory 2325 is a read-and-write memory device. However, unlike storage device 2335, the system memory 2325 is a volatile read-and-write memory, such as random-access memory. The system memory 2325 stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieve instructions to execute and data to process in order to execute the processes of some embodiments.

The bus 2305 also connects to the input and output devices 2340 and 2345. The input devices 2340 enable the user to communicate information and select commands to the electronic system 2300. The input devices 2340 include alphanumeric keyboards and pointing devices (also called "cursor control devices"). The output devices 2345 display images generated by the electronic system 2300. The output devices 2345 include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs), or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments described above only show one hardware accelerator per host computer. However, one of ordinary skill will realize that the methodology and architecture of some embodiments can be used to provide direct, passthrough access to multiple hardware accelerators on one host computer. Thus, one of ordinary skill in the art would understand that the invention is not to be limited by the foregoing illustrative details, but rather is to be defined by the appended claims.

We claim:

1. A method for performing radio access network (RAN) functions in a cloud, the method comprising:
   at a user-level tracing application that executes on a first machine deployed on a first host computer in the cloud, the user-level tracing application operating on top of a distributed RAN intelligent controller (dRIC) that executes across the first host computer as well as a plurality of additional host computers in the cloud:
   receiving data, via the dRIC, from a RAN component;
   using the received data to generate information related to traffic performance for at least one user, thereby offloading the generation of said information from the RAN component; and
   providing the generated information to the dRIC for later use by a different application that executes on top of the dRIC on a second machine deployed on a second host computer in the cloud.

2. The method of claim 1, wherein providing the generated information to the dRIC comprises storing the information in a database of the dRIC for later use by the different application.

3. The method of claim 1, wherein the second host computer and second machine are the same as the first host computer and first machine, wherein the different application that uses the stored information executes on top of the dRIC on the same machine as the user-level tracing application.

4. The method of claim 1, wherein the different application that uses the stored information executes on a different machine than the user-level tracing application.

5. The method of claim 2, wherein the information is stored in the database of the dRIC by the user-level tracing application via a shared data layer (SDL) and later retrieved by the different application via the SDL.

6. The method of claim 1, wherein providing the generated information to the dRIC comprises providing the generated information to the different application via the dRIC.

7. The method of claim 6, wherein the dRIC comprises a messaging infrastructure via which the generated information is provided to the different application.

8. The method of claim 1 further comprising, prior to receiving the data:
   sending a subscription request for the data to the RAN component via the dRIC; and
   receiving a subscription acknowledgment from the RAN component via the dRIC.

9. The method of claim 8, wherein:
   the dRIC receives the subscription request from the user-level tracing application through a set of APIs of the dRIC; and
   the dRIC converts the subscription request received from the user-level tracing application into a subscription request in a format recognized by the RAN component.

10. The method of claim 1, wherein the data received from the RAN component comprises at least one of (i) radio resource control (RRC) messages, (ii) user traffic volume and performance data for one or more telecommunications protocols, (iii) user radio frequency (RF) condition data, and (iv) user RF resource consumption data.

11. The method of claim 1, wherein the generated information comprises at least one of data regarding tracking of user behavior in a cell, data regarding tracking of user RF condition, data regarding tracking of user data traffic performance for one or more telecommunications protocols, and data regarding tracking user RF resources consumption.

12. The method of claim 1, wherein using the received data to generate information related to traffic performance for at least one user comprises applying a machine learning algorithm to the received data.

13. A non-transitory machine-readable medium storing a user-level tracing application which when executed by at least one processing unit of a first host computer performs radio access network (RAN) functions in a cloud, the user-level tracing application executing on a first machine deployed on the first host computer, the user-level tracing application operating on top of a distributed RAN intelligent controller (dRIC) that executes across the first host computer as well as a plurality of additional host computers in the cloud, the user-level tracing application comprising sets of instructions for:
   receiving data, via the dRIC, from a RAN component;
   using the received data to generate information related to traffic performance for at least one user, thereby offloading the generation of said information from the RAN component; and
   providing the generated information to the dRIC for later use by a different application that executes on top of the dRIC on a second machine deployed on a second host computer in the cloud.

14. The non-transitory machine-readable medium of claim 13, wherein the set of instructions for providing the generated information to the dRIC comprises a set of instructions for storing the information in a database of the dRIC for later use by the different application.

15. The non-transitory machine-readable medium of claim 14, wherein the information is stored in the database of the dRIC by the user-level tracing application via a shared data layer (SDL) and later retrieved by the different application via the SDL.

16. The non-transitory machine-readable medium of claim 13, wherein the set of instructions for providing the generated information to the dRIC comprises a set of instructions for providing the generated information to the different application via the dRIC.

17. The non-transitory machine-readable medium of claim 16, wherein the dRIC comprises a messaging infrastructure via which the generated information is provided to the different application.

18. The non-transitory machine-readable medium of claim 13, wherein the user-level tracing application further comprises set of instructions for, prior to receiving the data:
   sending a subscription request for the data to the RAN component via the dRIC; and
   receiving a subscription acknowledgment from the RAN component via the dRIC,
   wherein the dRIC receives the subscription request from the user-level tracing application through a set of APIs of the dRIC,
   wherein the dRIC converts the subscription request received from the user-level tracing application into a subscription request in a format recognized by the RAN component.

19. The non-transitory machine-readable medium of claim 13, wherein the data received from the RAN component comprises at least one of (i) radio resource control (RRC) messages, (ii) user traffic volume and performance data for one or more telecommunications protocols, (iii) user radio frequency (RF) condition data, and (iv) user RF resource consumption data.

20. The non-transitory machine-readable medium of claim 13, wherein the generated information comprises at least one of data regarding tracking of user behavior in a cell, data regarding tracking of user RF condition, data regarding tracking of user data traffic performance for one or more telecommunications protocols, and data regarding tracking user RF resources consumption.

21. The non-transitory machine-readable medium of claim 13, wherein the set of instructions for using the received data to generate information related to traffic performance for at least one user comprises a set of instructions for applying a machine learning algorithm to the received data.

* * * * *